United States Patent
Wu

(10) Patent No.: US 12,324,050 B2
(45) Date of Patent: Jun. 3, 2025

(54) DUAL ACTIVE PROTOCOL STACK OPERATION FOR HANDOVER AND PSCELL CHANGE

(71) Applicant: GOOGLE LLC, Mountain View, CA (US)

(72) Inventor: Chih-Hsiang Wu, Taoyuan (TW)

(73) Assignee: GOOGLE LLC, Mountain View, CA (US)

( * ) Notice: Subject to any disclaimer, the term of this patent is extended or adjusted under 35 U.S.C. 154(b) by 369 days.

(21) Appl. No.: 17/798,657

(22) PCT Filed: Feb. 10, 2021

(86) PCT No.: PCT/US2021/017323
§ 371 (c)(1),
(2) Date: Aug. 10, 2022

(87) PCT Pub. No.: WO2021/163092
PCT Pub. Date: Aug. 19, 2021

(65) Prior Publication Data
US 2023/0083266 A1    Mar. 16, 2023

Related U.S. Application Data

(60) Provisional application No. 63/004,825, filed on Apr. 3, 2020, provisional application No. 62/976,346, filed on Feb. 13, 2020.

(51) Int. Cl.
*H04W 76/30* (2018.01)
*H04W 36/00* (2009.01)
*H04W 36/18* (2009.01)

(52) U.S. Cl.
CPC ....... *H04W 76/30* (2018.02); *H04W 36/0033* (2013.01); *H04W 36/185* (2023.05)

(58) Field of Classification Search
CPC .................. H04W 76/30; H04W 36/0033; H04W 36/185
See application file for complete search history.

(56) References Cited

U.S. PATENT DOCUMENTS 12,120,504  B2 * 10/2024  Xie .................. H04W 36/0011
2013/0029668  A1 *  1/2013  Uchiyama ......... H04W 36/0088
                                                         455/438

(Continued)

FOREIGN PATENT DOCUMENTS

WO    WO-2019/240770 A1    12/2019

OTHER PUBLICATIONS

International Search Report and Written Opinion for Application No. PCT/US2021/017323, dated Apr. 28, 2021.

(Continued)

*Primary Examiner* — Brenda H Pham
(74) *Attorney, Agent, or Firm* — MARSHALL, GERSTEIN & BORUN LLP

(57) ABSTRACT

A central unit (CU) of a distributed base station for configuring a dual active protocol stack (DAPS) procedure at a UE communicating with the distributed base station via a source distributed unit (DU) (i) determines (1002) that the UE is to perform the DAPS procedure in order to disconnect from the source DU and connect to a target DU; and (ii) transmits (1008), to the source DU, an indication that the source DU is to continue communicating with the UE during the DAPS procedure.

20 Claims, 10 Drawing Sheets

(56) References Cited

U.S. PATENT DOCUMENTS

| 2019/0069333 | A1 | 2/2019 | Kim |
| 2019/0141742 | A1 | 5/2019 | Zhou et al. |
| 2019/0166526 | A1 | 5/2019 | Xu et al. |
| 2019/0387444 | A1 | 12/2019 | Byun et al. |
| 2020/0022035 | A1 | 1/2020 | Kadiri et al. |
| 2020/0029389 | A1 | 1/2020 | Yilmaz et al. |
| 2020/0037248 | A1 | 1/2020 | Zhou et al. |
| 2020/0314710 | A1 | 10/2020 | Paladugu et al. |
| 2020/0314714 | A1* | 10/2020 | Jung .................. H04W 76/27 |
| 2020/0329405 | A1* | 10/2020 | Awoniyi-Oteri .......................... H04W 36/0085 |
| 2021/0014764 | A1 | 1/2021 | Zhang et al. |
| 2022/0369174 | A1* | 11/2022 | Centonza .............. H04W 76/19 |

OTHER PUBLICATIONS

International Search Report and Written Opinion for Application No. PCT/US2021/017319, dated May 11, 2021.
Qualcomm Incorporated, "Source Connection Handling During DAPS HO," 3GPP Draft (2019).
Qualcomm Inc., Email Discussion report for [107#79] [LTE/feMOB] Capability Coordination for RUDI HO, 3GPP Draft (2019).
Qualcomm Incorporated et al., "UE Capability Coordination Signalling Aspects for DAPS Based Enhanced MBB HO," 3GPP Draft (2019).
Search Report for European Application No. 21753716.6, dated Jul. 4, 2022.
Huawei, "DAPS HO in Split gNB," 3GPP Draft (Nov. 8, 2019).
CATT, "Discussion E1 impact during DAPS Handover," 3GPP Draft (2019).
First Examination Report for India Application No. 2022470048768, dated Jan. 11, 2023.
First Examination Report for India Application No. 202247049484, dated Dec. 13, 2022.
Office Action for European Application No. 21753716.6, dated Aug. 1, 2024.
"3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 16)," 3GPP TS 36.300 V16.0.0 (2019).
"5G; NR; Overall description; Stage-2 (3GPP TS 38.300 version 15.8.0 Release 15)," ETSI TS 138 300 V15.8.0 (2020).
"5G; NR; Packet Data Convergence Protocol (PDCP) specification (3GPP TS 38.323 version 15.5.0 Release 15)," ETSI TS 138 323 V15.5.0 (2019).
"5G; NR; Radio Resource Control (RRC); Protocol specification (3GPP TS 38.331 version 15.8.0 Release 15)," ETSI TS 138 331 V15.8.0 (2020).
"LTE; Evolved Universal Terrestrial Radio Access (E-UTRA); Packet Data Convergence Protocol (PDCP) specification (3GPP TS 36.323 version 15.5.0 Release 15)," ETSI TS 136 323 V15.5.0 (2020).
"LTE; Evolved Universal Terrestrial Radio Access (E-UTRA); Radio Resource Control (RRC); Protocol specification (3GPP TS 36.331 version 15.8.0 Release 15)," ETSI TS 136 331 V15.8.0 (2020).
"Universal Mobile Telecommunications System (UMTS); LTE; 5G; NR; Multi-connectivity; Overall description; Stage-2 (3GPP TS 37.340 version 15.7.0 Release 15)," ETSI TS 137 340 V15.7.0 (2019).
3GPP RAN2 email discussion [108#35][LTE Mob] Running RRC CR (Ericsson) (2020).
Intel Corporation, "RRC running CR for NR mobility on DAPS HO," 3GPP TSG-RAN WG2 Meeting #109 (2020).
Qualcomm Incorporated, "LTE mobility enhancements for eMBB HO using dual active protocol stack," 3GPP TSG-RAN WG2 Meeting #105bis (2019).
R3-196132, R2-1914640, 3GPP RAN2 email discussion [108#34][NR Mob] Running RRC CR for CHO and DAPS (Intel) (2020).

* cited by examiner

DUAL ACTIVE PROTOCOL STACK OPERATION FOR HANDOVER AND PSCELL CHANGE

CROSS-REFERENCE TO RELATED APPLICATIONS

This patent application is a national stage application, filed under 35 U.S.C. § 371, of International Application No. PCT/US21/17323, filed Feb. 10, 2021 and entitled "DUAL ACTIVE PROTOCOL STACK OPERATION FOR HANDOVER AND PSCELL CHANGE," which claims priority to and the benefit of U.S. Provisional Patent Application No. 62/976,346, filed on Feb. 13, 2020 and entitled "DUAL ACTIVE PROTOCOL STACK OPERATION FOR HANDOVER AND PSCELL CHANGE," and which also claims priority to and the benefit of U.S. Provisional Patent Application No. 63/004,825, filed on Apr. 3, 2020 and entitled "DUAL ACTIVE PROTOCOL STACK OPERATION FOR HANDOVER AND PSCELL CHANGE," the entire disclosures of which are hereby incorporated by reference herein in their entireties.

FIELD OF THE DISCLOSURE

This disclosure relates generally to wireless communications and, more particularly, to dual active protocol stack (DAPS) operations related to handover and primary secondary cell (PSCell) change procedures.

BACKGROUND

This background description is provided for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

In telecommunication systems, the Packet Data Convergence Protocol (PDCP) sublayer of the radio protocol stack provides services such as transfer of user-plane data, ciphering, integrity protection, etc. For example, the PDCP layer defined for the Evolved Universal Terrestrial Radio Access (EUTRA) radio interface (see 3GPP specification TS 36.323) and New Radio (NR) (see 3GPP specification TS 38.323) provides sequencing of protocol data units (PDUs) in the uplink direction (from a user device, also known as a user equipment (UE), to a base station) as well as in the downlink direction (from the base station to the UE). Further, the PDCP sublayer provides services for signaling radio bearers (SRBs) to the Radio Resource Control (RRC) sublayer. The PDCP sublayer also provides services for data radio bearers (DRBs) to a Service Data Adaptation Protocol (SDAP) sublayer or a protocol layer such as an Internet Protocol (IP) layer, an Ethernet protocol layer, and an Internet Control Message Protocol (ICMP) layer. Generally speaking, the UE and a base station can use SRBs to exchange RRC messages as well as non-access stratum (NAS) messages, and can use DRBs to transport data on a user plane.

UEs can use several types of SRBs and DRBs. When operating in dual connectivity (DC), the cells associated with the base station operating as the master node (MN) define a master cell group (MCG), and the cells associated with the base station operating as the secondary node (SN) define the secondary cell group (SCG). So-called SRB1 resources carry RRC messages, which in some cases include NAS messages over the dedicated control channel (DCCH), and SRB2 resources support RRC messages that include logged measurement information or NAS messages, also over the DCCH but with lower priority than SRB1 resources. More generally, SRB1 and SRB2 resources allow the UE and the MN to exchange RRC messages related to the MN and embed RRC messages related to the SN, and also can be referred to as MCG SRBs. SRB3 resources allow the UE and the SN to exchange RRC messages related to the SN, and can be referred to as SCG SRBs. Split SRBs allow the UE to exchange RRC messages directly with the MN via lower layer resources of the MN and the SN. Further, DRBs terminated at the MN and using the lower-layer resources of only the MN can be referred as MCG DRBs, DRBs terminated at the SN and using the lower-layer resources of only the SN can be referred as SCG DRBs, and DRBs terminated at the MCG but using the lower-layer resources of the MN, the SN, or both the MN and the SN can be referred to as split DRBs.

The UE in some scenarios can concurrently utilize resources of multiple nodes (e.g., base stations or components of a distributed base station) of a radio access network (RAN), interconnected by a backhaul. When these network nodes support different radio access technologies (RATs), this type of connectivity is referred to as Multi-Radio Dual Connectivity (MR-DC). When a UE operates in MR-DC, one base station operates as the MN that covers a primary cell (PCell), and the other base station operates as the SN that covers a primary secondary cell (PSCell). The UE communicates with the MN (via the PCell) and the SN (via the PSCell). In other scenarios, the UE utilizes resources of one base station at a time. One base station and/or the UE determines that the UE should establish a radio connection with another base station. For example, one base station can determine to hand the UE over to the second base station, and initiate a handover procedure. The UE in other scenarios can concurrently utilize resources of a RAN node (e.g., a single base station or a component of a distributed base station), interconnected by a backhaul.

3GPP TS 36.300 v15.6.0 and 38.300 v15.6.0 describe legacy procedures for handover (or called reconfiguration with sync) scenarios. These procedures involve messaging (e.g., RRC signaling and preparation) among RAN nodes and the UE. UEs can perform handover procedures to switch from one cell to another, whether in single connectivity (SC) or DC operation. The UE may handover from a cell of a serving base station to a target cell of a target base station, or from a cell of a first distributed unit (DU) of a serving base station to a target cell of a second DU of the same base station, depending on the scenario.

3GPP TS 37.340 v15.7.0 describes legacy procedures for a UE to change PSCells in DC scenarios. These procedures involve messaging (e.g., RRC signaling and preparation) among RAN nodes and the UE. The UE may perform PSCell change from a PSCell of a serving SN to a target PSCell of a target SN, or from a PSCell of a source distributed unit (DU) of a base station to a PSCell of a target DU of the same base station, depending on the scenario.

More recently, 3GPP has been discussing dual active protocol stack (DAPS) handover and DAPS PSCell change procedures for achieving 0ms user data interruption during handover and PSCell change. Generally, the length of interruption experienced at the UE depends on a time difference between the time when a radio link connection at a source cell is released and the time when a radio link connection at a target cell is established. If the release time is no earlier than the established time, achieving 0ms user data interruption is possible. Using a DAPS, the UE can simultaneously communicate with the source cell while establishing a radio link connection at the target cell, and subsequently stop communicating with the source cell after establishing a radio link connection at the target cell, when performing DAPS handover and PSCell change.

In some cases, the RAN can provide a DAPS configuration (e.g., a DAPS handover configuration, a DAPS PSCell change configuration) to the UE for the UE to perform a DAPS handover or DAPS PSCell change, respectively. However, in some of these scenarios, the UE and/or RAN do not properly handle the DAPS configuration. For example, the UE may fail to perform DAPS handover or DAPS PSCell change upon receiving the DAPS configuration from a source RAN node, and as a consequence, the UE performs an RRC connection reestablishment procedure with the source RAN node to recover the reconfiguration failure, thereby causing data interruption. As another example, the source RAN node may be unaware that the UE is capable of DAPS handover or DAPS PSCell change, and as a consequence, fail to instruct the UE 102 to perform DAPS handover or DAPS PSCell change.

SUMMARY

Generally speaking, a UE and one or more base stations operating in a RAN implement the techniques of this disclosure to prepare the UE to perform DAPS handover or DAPS PSCell change upon receiving a corresponding DAPS configuration (or an indication of the corresponding DAPS configuration). Using these techniques, for example, the RAN can configure a UE communicating with a base station via a plurality of cells to release some of the cells, so that radio frequency (RF) chain(s) or transceiver(s) of the UE that were previously operating when communicating with the released cells become available for use to perform DAPS handover or DAPS PSCell change. As another example, the RAN can configure a UE communicating in dual connectivity (DC) with a master node (MN) and a secondary node (SN) to release the SN, so that RF chain(s) or transceiver(s) of the UE that were previously operating when communicating with the released SN become available for use to perform DAPS handover or DAPS PSCell change.

One example implementation of these techniques is a method, in a RAN, for enabling execution of a DAPS procedure at a UE. The method includes determining, by processing hardware, that the UE is to release at least one cell via which the UE communicates with the RAN, prior to executing the DAPS procedure. The method also includes causing, by the processing hardware, the UE to release the at least one cell. The method also includes transmitting, by the processing hardware, a command to the UE to execute the DAPS procedure.

Another example implementation of these techniques is a method, in a central unit (CU) of a distributed base station, for configuring a dual active protocol stack (DAPS) procedure at a UE communicating with the distributed base station via a source distributed unit (DU). The method includes determining, by the processing hardware and to the UE, that the UE is to perform the DAPS procedure to disconnect from the source DU and connect to a target DU. The method also includes transmitting, by the processing hardware and to the source DU, an indication that the source DU is to continue communicating with the UE during the DAPS procedure. The method also includes transmitting, in response to determining that the UE has begun communicating with the target DU, a release indication to the target DU, the release indication causing the target DU to release the DAPS procedure. The method also includes subsequently to transmitting the release indication, causing the source DU to release the UE context.

DETAILED DESCRIPTION OF THE DRAWINGS

Figure 1A:
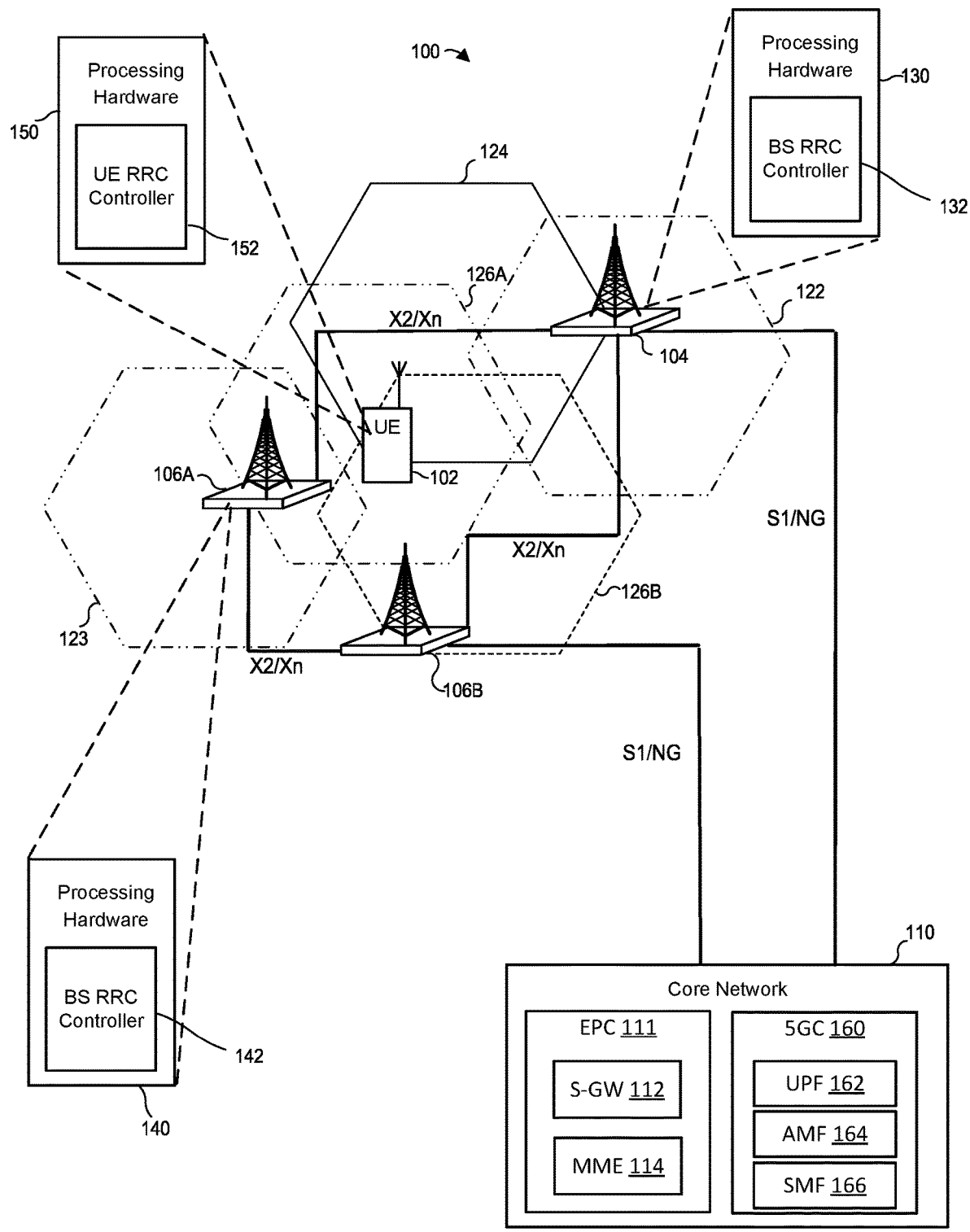
FIG. 1A is a block diagram of an example system in which a RAN and a UE can implement the techniques of this disclosure for managing DAPS procedures, including DAPS handover and DAPS PSCell change.

FIG. 1A depicts an example wireless communication system 100 that can implement DAPS operation techniques of this disclosure. The wireless communication system 100 includes a UE 102, as well as base stations 104, 106A, 106B that are connected to a core network (CN) 110. The base stations 104, 106A, 106B can be any suitable type, or types, of base stations, such as an evolved node B (eNB), a next-generation eNB (ng-eNB), or a 5G Node B (gNB), for example. As a more specific example, the base station 104 can be an eNB or a gNB, and the base stations 106A and 106B can be gNBs.

The base station 104 supports a cell 124, the base station 106A supports a cell 126A, and the base station 106B supports a cell 126B. The cell 124 partially overlaps with both of cells 126A and 126B, such that the UE 102 can be in range to communicate with base station 104 while simultaneously being in range to communicate with base station 106A or 106B (or in range to detect or measure the signal from both base stations 106A or 106B, etc.). The overlap can make it possible for the UE 102 to hand over between cells (e.g., from cell 124 to cell 126A or 126B) or base stations (e.g., from base station 104 to base station 106A or base station 106B) before the UE 102 experiences radio link failure, for example. Moreover, the overlap allows the various dual connectivity (DC) scenarios discussed below. For example, the UE 102 can communicate in DC with the base station 104 (operating as an MN) and the base station 106A (operating as an SN) and, upon completing a handover, can communicate with the base station 106B (operating as an MN). As another example, the UE 102 can communicate in DC with the base station 104 (operating as an MN) and the base station 106A (operating as an SN) and, upon completing an SN change, can communicate with the base station 104 (operating as an MN) and the base station 106B (operating as an SN).

More particularly, when the UE 102 is in DC with the base station 104 and the base station 106A, the base station 104 operates as a master eNB (MeNB), a master ng-eNB (Mng-eNB), or a master gNB (MgNB), and the base station 106A operates as a secondary gNB (SgNB) or a secondary ng-eNB (Sng-eNB). In implementations and scenarios where the UE 102 is in SC with the base station 104 but is capable of operating in DC, the base station 104 operates as an MeNB, an Mng-eNB or an MgNB, and the base station 106A operates as a candidate SgNB (C-SgNB) or a candidate Sng-eNB (C-Sng-eNB). Although various scenarios are described below in which the base station 104 operates as an MN and the base station 106A (or 106B) operates as an SN or T-SN, any of the base stations 104, 106A, 106B generally can operate as an MN, an SN or a T-SN in different scenarios. Thus, in some implementations, the base station 104, the base station 106A, and the base station 106B can implement similar sets of functions and each support MN, SN, and T-SN operations.

In operation, the UE 102 can use a radio bearer (e.g., a DRB or an SRB) that at different times terminates at an MN (e.g., the base station 104) or an SN (e.g., the base station 106A). For example, after handover to the base station 106B, the UE 102 can use a radio bearer (e.g., a DRB or an SRB) that at different times terminates at the base station 106B. The UE 102 can apply one or more security keys when communicating on the radio bearer, in the uplink (from the UE 102 to a base station) and/or downlink (from a base station to the UE 102) direction.

The base station 104 includes processing hardware 130, which can include one or more general-purpose processors (e.g., central processing units (CPUs) and a computer-readable memory storing machine-readable instructions executable on the one or more general-purpose processor(s), and/or special-purpose processing units. The processing hardware 130 in the example implementation in FIG. 1A includes a base station RRC controller 132 that is configured to manage or control RRC configurations and RRC procedures. For example, the base station RRC controller 132 can be configured to support RRC messaging associated with DAPS handover and DAPS PSCell change procedures, and/or to support the necessary operations when the base station 104 operates as an MN, as discussed below.

The base station 106A includes processing hardware 140, which can include one or more general-purpose processors (e.g., CPUs) and a computer-readable memory storing machine-readable instructions executable on the general-purpose processor(s), and/or special-purpose processing units. The processing hardware 140 in the example implementation of FIG. 1A includes a base station RRC controller 142 that is configured to manage or control RRC configurations and RRC procedures. For example, the base station RRC controller 142 can be configured to support RRC messaging associated with DAPS handover and DAPS PSCell change procedures, and/or to support the necessary operations when the base station 106A operates as an SN or target SN (T-SN), as discussed below. While not shown in FIG. 1A, the base station 106B can include processing hardware similar to the processing hardware 140 of the base station 106A.

The UE 102 includes processing hardware 150, which can include one or more general-purpose processors (e.g., CPUs) and a computer-readable memory storing machine-readable instructions executable on the general-purpose processor(s), and/or special-purpose processing units. The processing hardware 150 in the example implementation of FIG. 1A includes a UE RRC controller 152 that is configured to manage or control RRC configurations RRC procedures. For example, the UE RRC controller 152 can be configured to support RRC messaging associated with DAPS handover and DAPS PSCell change procedures in accordance with any of the implementations discussed below.

The CN 110 can be an evolved packet core (EPC) 111 or a fifth-generation core (5GC) 160, both of which are depicted in FIG. 1A. The base station 104 can be an eNB supporting an S1 interface for communicating with the EPC 111, an ng-eNB supporting an NG interface for communicating with the 5GC 160, or as a gNB that supports the NR radio interface as well as an NG interface for communicating with the 5GC 160. The base station 106A can be an EN-DC gNB (en-gNB) with an S1 interface to the EPC 111, an en-gNB that does not connect to the EPC 111, a gNB that supports the NR radio interface and an NG interface to the 5GC 160, or a ng-eNB that supports an EUTRA radio interface and an NG interface to the 5GC 160. To directly exchange messages with each other during the scenarios discussed below, the base stations 104, 106A, and 106B can support an X2 or Xn interface.

Among other components, the EPC 111 can include a Serving Gateway (S-GW) 112 and a Mobility Management Entity (MME) 114. The S-GW 112 is generally configured to transfer user-plane packets related to audio calls, video calls, Internet traffic, etc., and the MME 114 is configured to manage authentication, registration, paging, and other related functions. The 5GC 160 includes a User Plane Function (UPF) 162 and an Access and Mobility Management (AMF) 164, and/or Session Management Function (SMF) 166. The UPF 162 is generally configured to transfer user-plane packets related to audio calls, video calls, Internet traffic, etc., the AMF 164 is configured to manage authentication, registration, paging, and other related functions, and the SMF 166 is configured to manage PDU sessions.

Generally, the wireless communication network 100 can include any suitable number of base stations supporting NR cells and/or EUTRA cells. For example, base station 104 and base station 106A can also support cells 122 and 123, respectively. More particularly, the EPC 111 or the 5GC 160 can be connected to any suitable number of base stations supporting NR cells and/or EUTRA cells. Although the examples below refer specifically to specific CN types (EPC, 5GC) and RAT types (5G NR and EUTRA), in general the techniques of this disclosure can also apply to other suitable radio access and/or core network technologies such as sixth generation (6G) radio access and/or 6G core network or 5G NR-6G DC, for example.

As indicated above, the wireless communication system 100 can support various procedures (e.g., DAPS handover, DAPS PSCell change, etc.) and modes of operation (e.g., SC or DC). Example operation of various procedures that can be implemented in the wireless communication system 100 will now be described.

In some implementations, the wireless communication system 100 supports a legacy handover preparation procedure (i.e., a non-DAPS handover preparation procedure). In one scenario, for example, the base station 104 can perform a non-DAPS handover preparation procedure to configure the UE 102 to handover from a cell 124 of the base station 104 to a cell 126A of the base station 106A. In this scenario, the base station 104 and the base station 106A operate as a source base station (S-BS) or a source MN (S-MN), and a target base station (T-BS) or a target MN (T-MN), respectively. In the non-DAPS handover preparation procedure, the base station 104 sends a Handover Request message to the base station 106A. In response to the Handover Request message, the base station 106A includes configuration parameters configuring radio resources for the UE 102 in a handover command message, includes the handover command message in a Handover Request Acknowledge message, and sends the Handover Request Acknowledge message to the base station 104. In turn, the base station 104 transmits the handover command message to the UE 102 and subsequently discontinues (or stops) transmitting data to or receiving data from the UE 102.

Upon receiving the handover command message, the UE 102 hands over to the base station 106A via cell 126A and communicates with the base station 106A by using the configuration parameters in the handover command message. Particularly, in response to the handover command message, the UE 102 disconnects from the cell 124 (or the base station 104), performs a random access procedure with the base station 106A via the cell 126A, and transmits a handover complete message to the base station 106A via cell 126A.

In some implementations, the wireless communication system 100 supports a DAPS handover preparation procedure. In one scenario for example, the base station 104 can perform a DAPS handover preparation procedure to configure the UE 102 to hand over from a cell 124 of the base station 104 to a cell 126B of the base station 106B. In this scenario, the base station 104 and the base station 106B operate as an S-BS or an S-MN, and a T-BS or a T-MN, respectively. In the DAPS handover preparation procedure, the base station 104 sends a Handover Request message to the base station 106B. In some implementations, the base station 104 can explicitly request DAPS handover in the Handover Request message, e.g., by including a DAPS indicator in the Handover Request message. In response to the Handover Request message, and to accept the request for DAPS handover, the base station 106B includes configuration parameters configuring radio resources for the UE 102 in a handover command, includes the handover command message in a Handover Request Acknowledge message, and sends the Handover Request Acknowledge message to the base station 104. In some implementations, the base station 106B can indicate DAPS handover in the handover command message, e.g., by including a DAPS handover configuration or a DAPS handover indicator in the handover command message, or can include an indicator in the Handover Request Acknowledge message. In turn, the base station 104 transmits the handover command message to the UE 102.

Upon receiving the handover command message, the UE 102 hands over to the base station 106B via cell 126B and communicates with the base station 106B by using the configuration parameters in the handover command message. Particularly, in response to the handover command message, whereas in the non-DAPS handover preparation procedure the UE 102 disconnects from the cell 124 (or the base station 104), the UE 102 in the DAPS handover preparation procedure maintains the connection to the base station 104 via cell 124, performs a random access procedure with the base station 106B via cell 126B, and transmits a handover complete message to the base station 106B via cell 126B.

In maintaining the connection to the base station 104 via cell 124 in the DAPS handover preparation procedure, the UE 102 effectively has two links, i.e., a source MCG link with the base station 104 and a target MCG link with the base station 106B. The UE 102 can continue receiving data (i.e., downlink data) from the base station 104 until the UE 102 receives an indication from the base station 106B to release the source MCG link with the base station 104. The UE 102 can continue transmitting data (e.g., new uplink data transmission or retransmission of PDCP SDUs) to the base station 104 until the UE 102 either successfully completes the random access procedure with the base station 106B or receives the indication from the base station 106B to release the MCG link with the base station 104.

In some implementations, in the handover preparation procedure scenarios above, the wireless communication system 100 supports DC operation. In one scenario, for example, after the UE 102 connects to the base station 104, the base station 104 can perform an SN addition procedure to add the base station 106A as an SN, thereby configuring the UE 102 to operate in DC with the base stations 104 and 106A. At this point, the base stations 104 and 106A operate as an MN and an SN, respectively. Later on, the MN 104 can initiate the non-DAPS or DAPS handover preparation procedures to handover the UE 102 to the T-MN 106B.

In some implementations, the wireless communication system 100 supports a legacy PSCell change preparation procedure (i.e., a non-DAPS PSCell change preparation procedure). In one scenario, for example, the UE 102 is initially in DC with the MN 104 (e.g., via PCell 124) and the SN 106A (via a PSCell 123). The SN 106A can provide a configuration for the T-PSCell 126A, for the UE 102. The UE 102 stops communicating with the SN 106A via PSCell 123 and attempts to connect to the T-PSCell 126A after receiving the configuration for the T-PSCell 126A. In another scenario, for example, while the UE 102 is in DC with the MN 104 and the SN 106A, the MN 104 determines to change the SN of the UE 102 from the base station 106A (which may be referred to as the source SN or S-SN) to the base station 106B (which may be referred to as the target SN or T-SN) as part of the non-DAPS PSCell change procedure. The UE 102 stops communicating with the S-SN 106A via PSCell 123 and attempts to connect to the T-SN 106B via T-PSCell 126B after receiving the configuration for the T-PSCell 126B.

In some implementations, the wireless communication system 100 supports DAPS PSCell change. In one scenario, for example, the UE 102 is initially in DC with the MN 104 (e.g., via PCell 124) and the SN 106A (via a PSCell 123). The SN 106A can provide a configuration for the T-PSCell 126A, for the UE 102. The UE 102 continues communicating with the SN 106A via PSCell 123 while attempting to connect to the T-PSCell 126A after receiving the configuration for the T-PSCell 126A. After the T-PSCell 126A begins to operate as the PSCell 126A for the UE 102, the UE 102 stops communicating with the SN 106A via PSCell 123. In another scenario, for example, while the UE 102 is in DC with the MN 104 and the SN 106A, the MN 104 determines to change the SN of the UE 102 from the base station 106A (which may be referred to as the source SN or S-SN) to the base station 106B (which may be referred to as the target SN or T-SN) as part of the DAPS PSCell change procedure. The UE 102 continues communicating with the S-SN 106A via PSCell 123 while attempting to connect to the T-SN 106B via T-PSCell 126B after receiving the configuration for the T-PSCell 126B. After the T-PSCell 126B begins to operate as the PSCell 126B for the UE 102, the UE 102 stops communicating with the S-SN 106A via PSCell 123.

In different configurations or scenarios of the wireless communication system 100, the base station 104 can operate as an MeNB, an Mng-eNB, or an MgNB, the base station 106B can operate as an MeNB, an Mng-eNB, an MgNB, an SgNB, or an Sng-eNB, and the base station 106A can operate as an SgNB or an Sng-eNB. The UE 102 can communicate with the base station 104 and the base station 106A or 106B via the same radio access technology (RAT), such as EUTRA or NR, or via different RATs.

When the base station 104 is an MeNB and the base station 106A is an SgNB, the UE 102 can be in EUTRA-NR DC (EN-DC) with the MeNB 104 and the SgNB 106A. When the base station 104 is an Mng-eNB and the base station 106A is an SgNB, the UE 102 can be in next generation (NG) EUTRA-NR DC (NGEN-DC) with the Mng-eNB 104 and the SgNB 106A. When the base station 104 is an MgNB and the base station 106A is an SgNB, the UE 102 can be in NR-NR DC (NR-DC) with the MgNB 104 and the SgNB 106A. When the base station 104 is an MgNB and the base station 106A is an Sng-eNB, the UE 102 can be in NR-EUTRA DC (NE-DC) with the MgNB 104 and the Sng-eNB 106A.

Figure 1B:
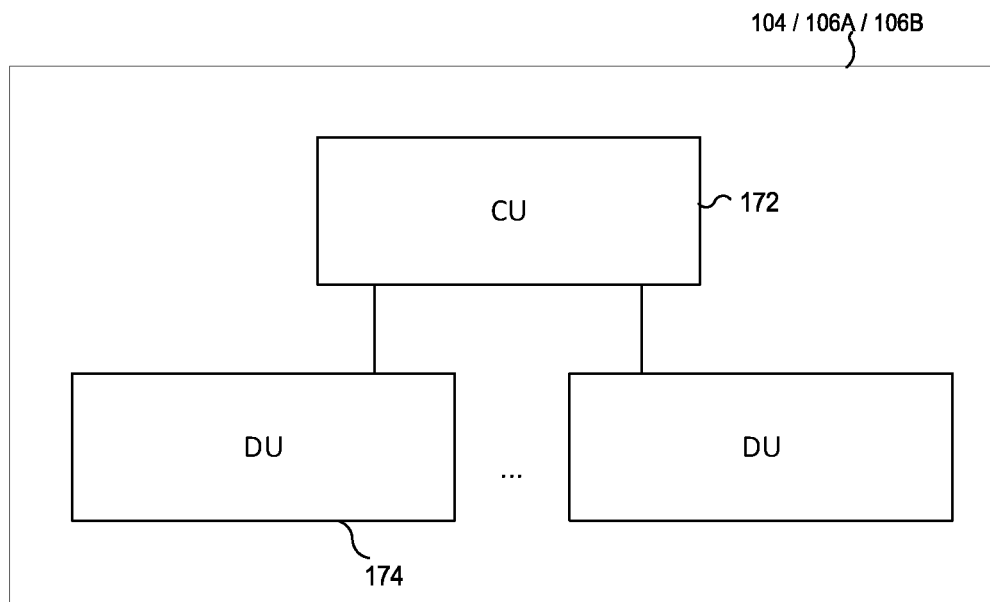
FIG. 1B is a block diagram of an example base station in which a centralized unit (CU) and a distributed unit (DU) can operate in the system of FIG. 1A.

FIG. 1B depicts an example, distributed implementation of any one or more of the base stations 104, 106A, 106B. In this implementation, the base station 104, 106A, or 106B includes a centralized unit (CU) 172 and one or more distributed units (DUs) 174. The CU 172 includes processing hardware, such as one or more general-purpose processors (e.g., CPUs) and a computer-readable memory storing machine-readable instructions executable on the general-purpose processor(s), and/or special-purpose processing units. For example, the CU 172 can include the processing hardware 130 or 140 of FIG. 1A. The processing hardware can include a base station RRC controller (e.g., RRC controller 142) configured to manage or control one or more RRC configurations and/or RRC procedures when the base station (e.g., base station 106A) operates as an SN.

Each of the DUs 174 also includes processing hardware that can include one or more general-purpose processors (e.g., CPUs) and computer-readable memory storing machine-readable instructions executable on the one or more general-purpose processors, and/or special-purpose processing units. For example, the processing hardware can include a medium access control (MAC) controller configured to manage or control one or more MAC operations or procedures (e.g., a random access procedure), and a radio link control (RLC) controller configured to manage or control one or more RLC operations or procedures when the base station (e.g., base station 106A) operates as a MN or an SN. The process hardware can also include a physical layer controller configured to manage or control one or more physical layer operations or procedures.

Figure 2:
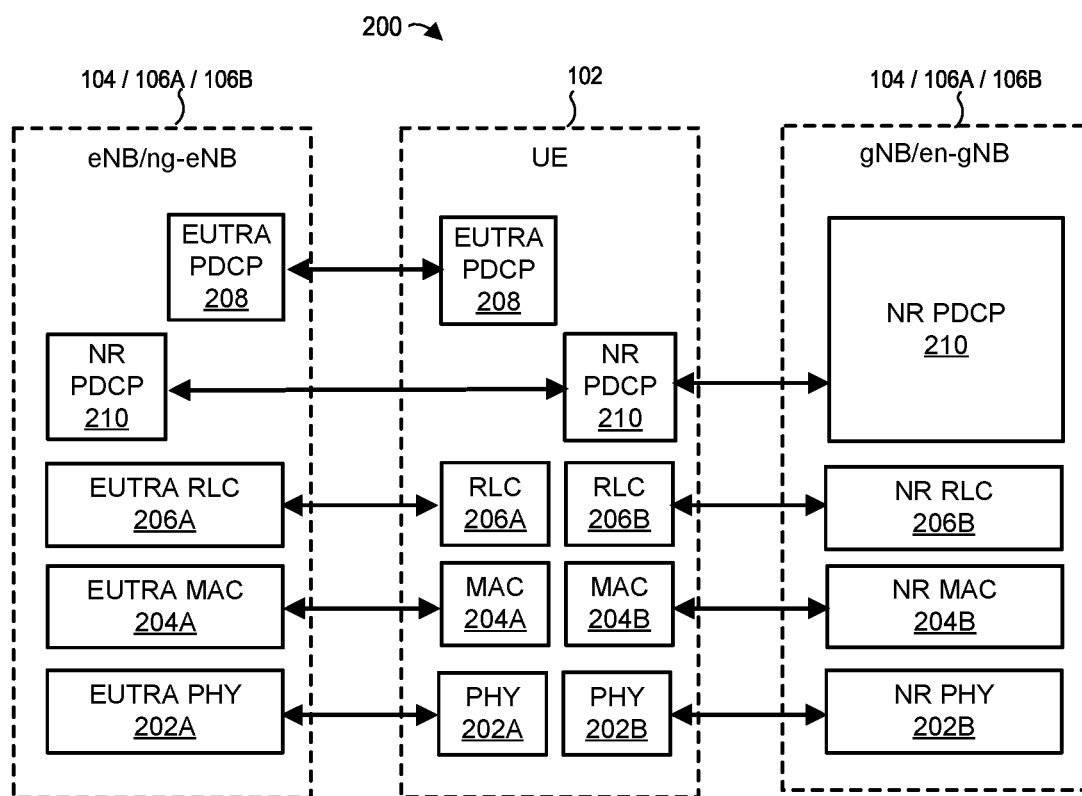
FIG. 2 is a block diagram of an example protocol stack, according to which the UE of FIG. 1A can communicate with base stations of FIG. 1A.

FIG. 2 illustrates, in a simplified manner, an example dual active protocol stack (DAPS) 200 according to which the UE 102 can communicate with an eNB/ng-eNB or a gNB (e.g., one or more of the base stations 104, 106A, 106B).

In the example stack 200, a physical layer (PHY) 202A of EUTRA provides transport channels to the EUTRA MAC sublayer 204A, which in turn provides logical channels to the EUTRA RLC sublayer 206A. The EUTRA RLC sublayer 206A in turn provides RLC channels to the EUTRA PDCP sublayer 208 and, in some cases, to the NR PDCP sublayer 210. Similarly, the NR PHY 202B provides transport channels to the NR MAC sublayer 204B, which in turn provides logical channels to the NR RLC sublayer 206B. The NR RLC sublayer 206B in turn provides RLC channels to the NR PDCP sublayer 210. The UE 102, in some implementations, supports both the EUTRA and the NR stack as shown in FIG. 2, to support handover between EUTRA and NR base stations and/or to support DC over EUTRA and NR interfaces. Further, as illustrated in FIG. 2, the UE 102 can support layering of NR PDCP 210 over EUTRA RLC 206A.

The EUTRA PDCP sublayer 208 and the NR PDCP sublayer 210 receive packets (e.g., from an Internet Protocol (IP) layer, layered directly or indirectly over the PDCP layer 208 or 210) that can be referred to as service data units (SDUs), and output packets (e.g., to the RLC layer 206A or 206B) that can be referred to as protocol data units (PDUs). Except where the difference between SDUs and PDUs is relevant, this disclosure for simplicity refers to both SDUs and PDUs as "packets."

On a control plane, the EUTRA PDCP sublayer 208 and the NR PDCP sublayer 210 can provide SRBs to exchange RRC messages, for example. On a user plane, the EUTRA PDCP sublayer 208 and the NR PDCP sublayer 210 can provide DRBs to support data exchange.

In scenarios where the UE 102 operates in EUTRA/NR DC (EN-DC), with the base station 104 operating as an MeNB and the base station 106A operating as an SgNB, the wireless communication system 100 can provide the UE 102 with an MN-terminated bearer that uses EUTRA PDCP sublayer 208, or an MN-terminated bearer that uses NR PDCP sublayer 210. The wireless communication system 100 in various scenarios can also provide the UE 102 with an SN-terminated bearer, which uses only the NR PDCP sublayer 210. The MN-terminated bearer can be an MCG bearer or a split bearer. The SN-terminated bearer can be an SCG bearer or a split bearer. The MN-terminated bearer can be an SRB (e.g., SRB1 or SRB2) or a DRB. The SN-terminated bearer can be an SRB or a DRB.

FIGS. 3 through 8 illustrate message sequences between the UE 102 and various base stations of the RAN (including base stations 104, 106A and/or 106B), for a number of scenarios and implementations relating to DAPS handover and DAPS PSCell change procedures.

Figure 3:
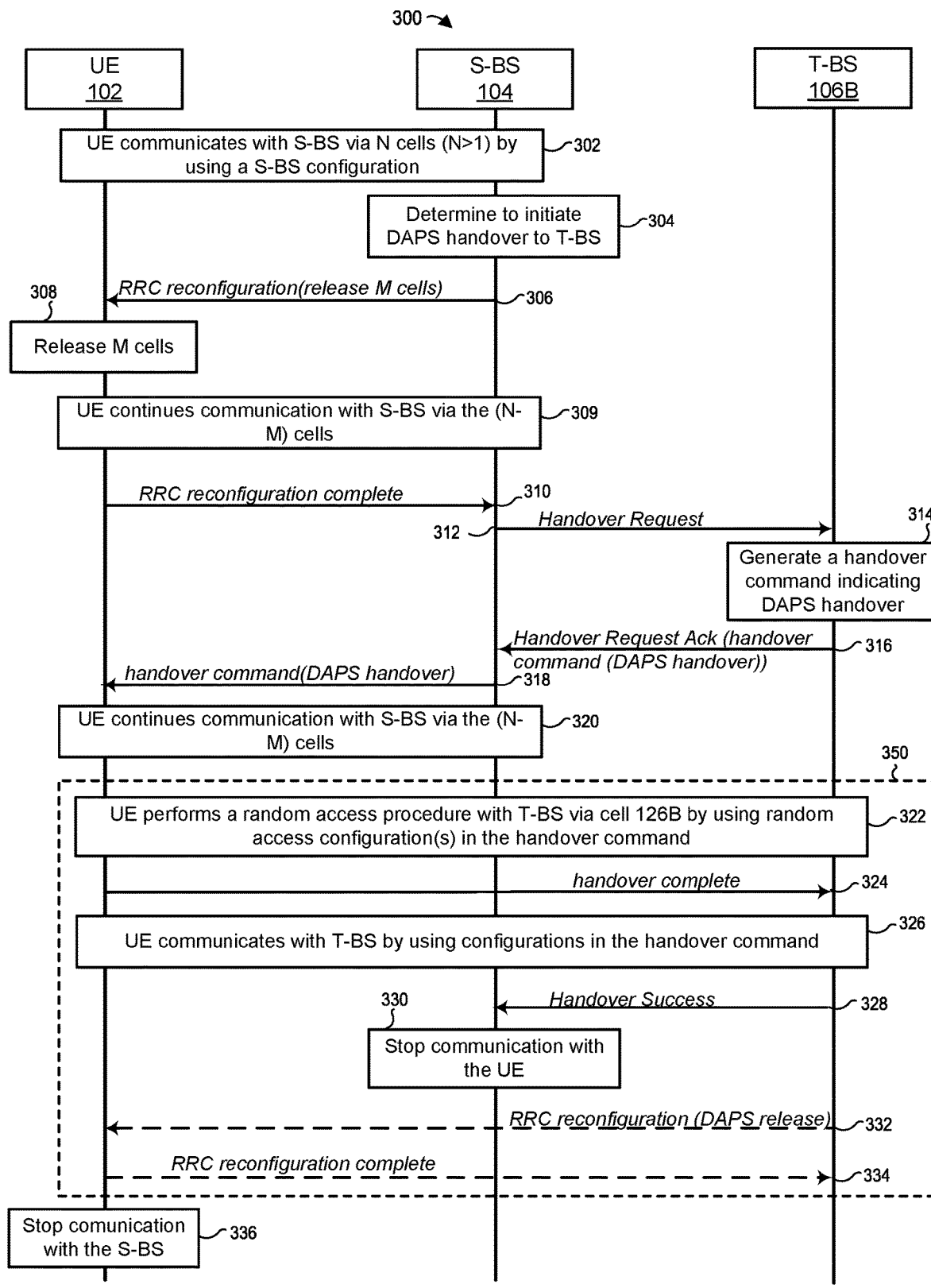
FIG. 3 is a messaging diagram of an example scenario in which a RAN prepares a DAPS handover procedure for a UE by releasing M of N cells via which the UE communicates with a source base station of the RAN prior to the UE performing DAPS handover to a target base station of the RAN.
Figure 4:
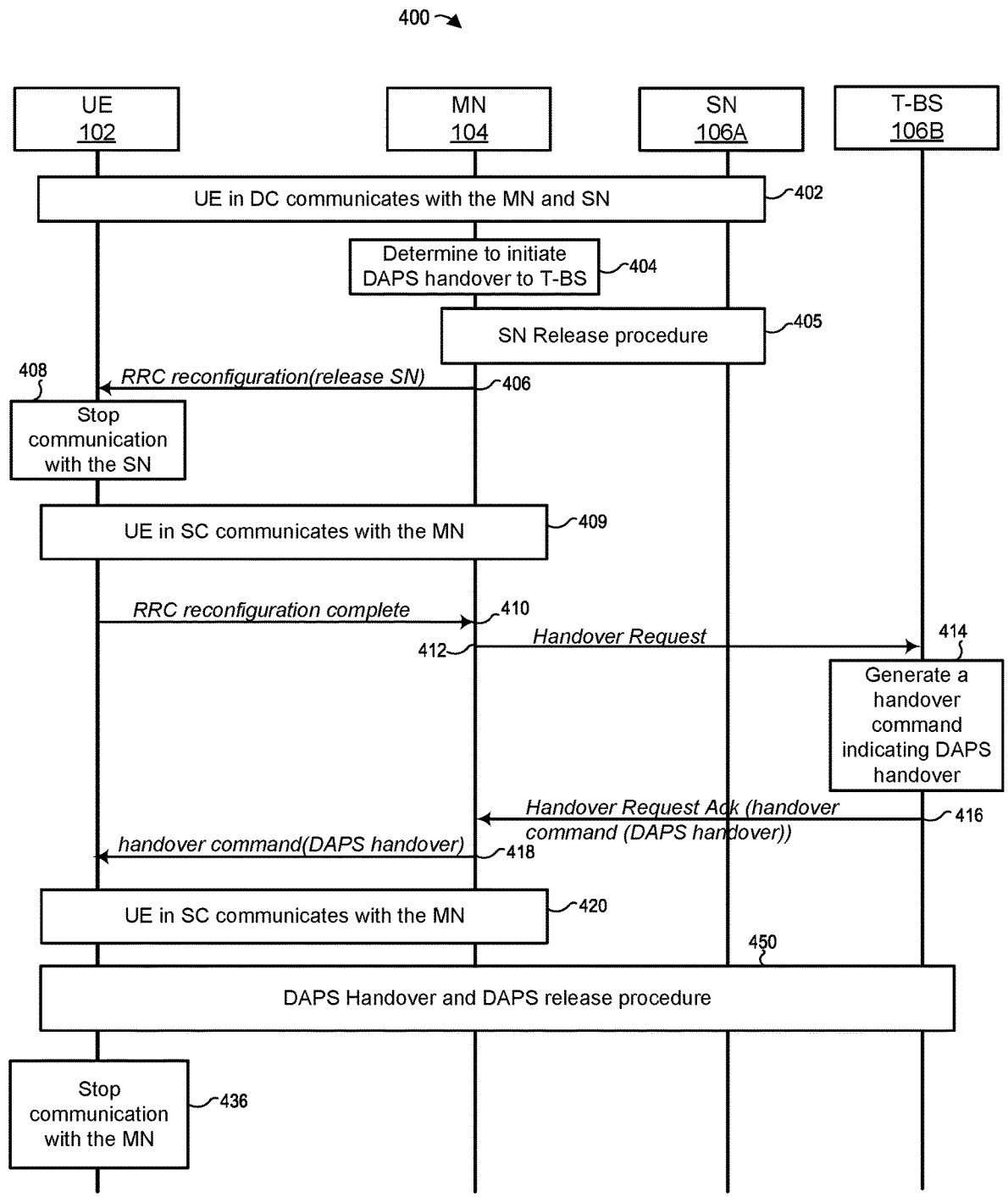
FIG. 4 is a messaging diagram of an example scenario in which a RAN prepares a DAPS handover procedure for a UE by releasing a source SN of the RAN prior to the UE performing DAPS handover to a target SN of the RAN.
Figure 5:
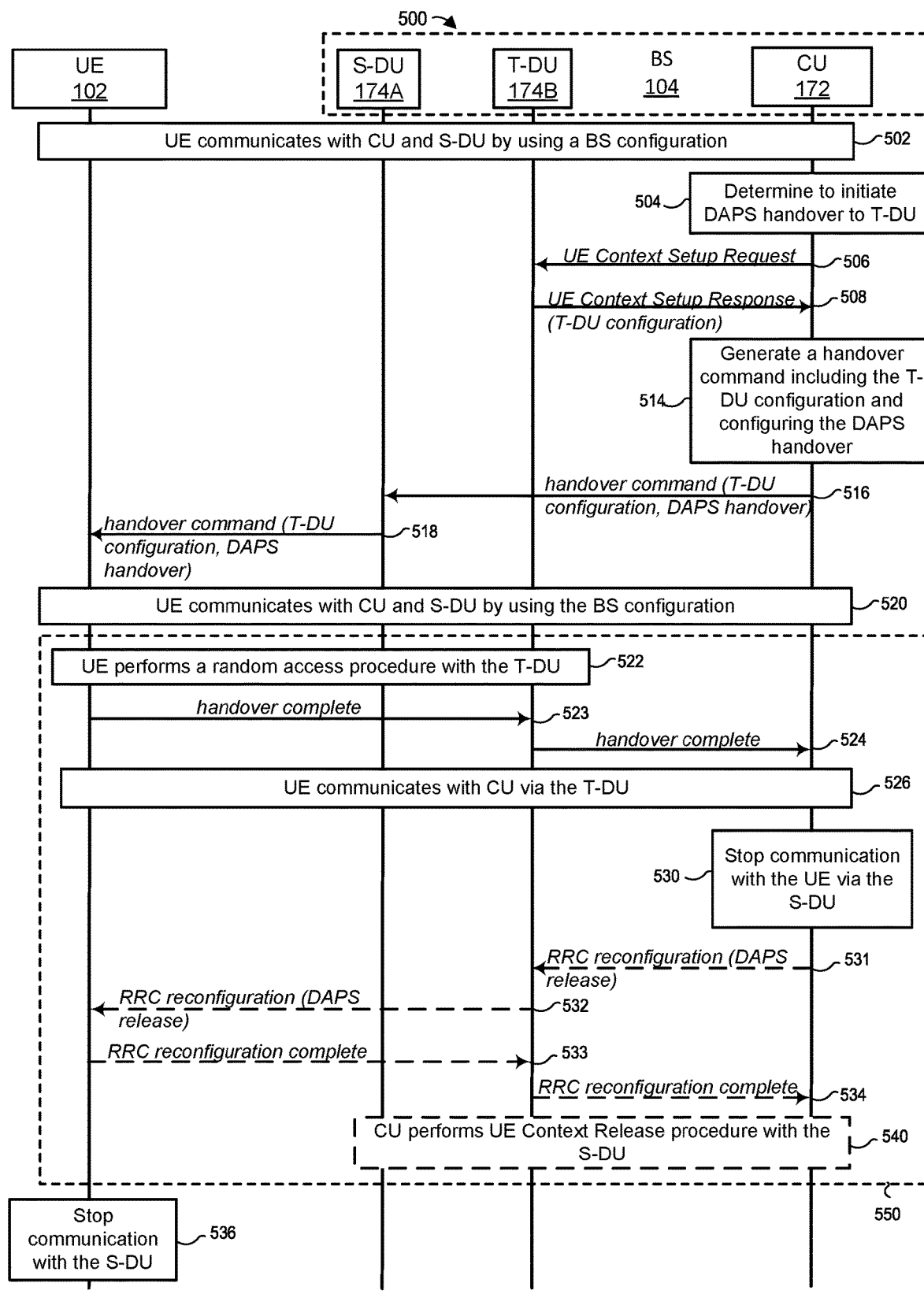
FIG. 5 is a messaging diagram of an example scenario in which a RAN prepares a UE to perform DAPS handover, from a source DU of a base station of the RAN to a target DU of a base station.
Figure 6:
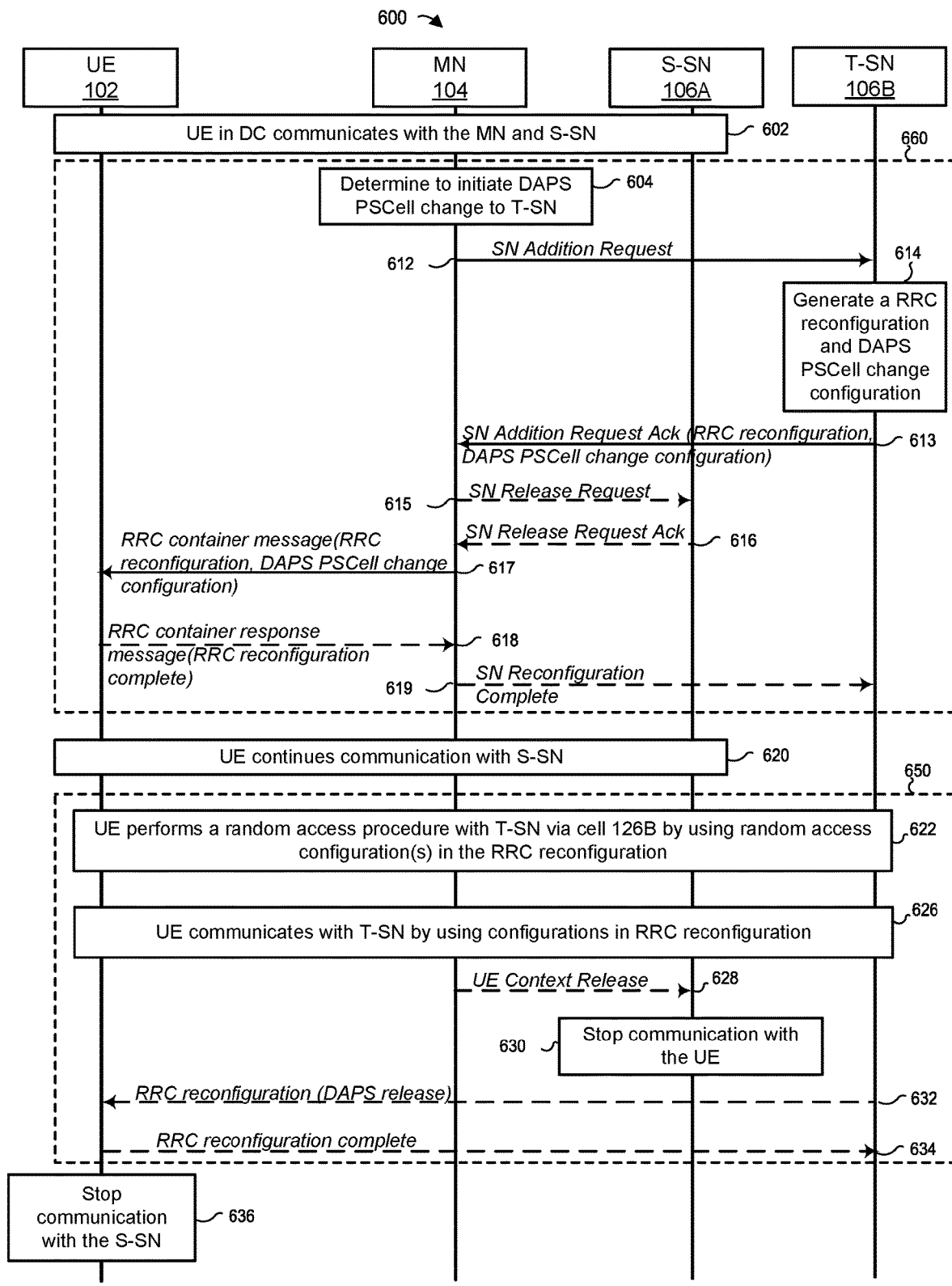
FIG. 6 is a messaging diagram of an example scenario in which an MN of the RAN initiates a DAPS PSCell change procedure for a UE, from a source SN to a target SN.
Figure 7:
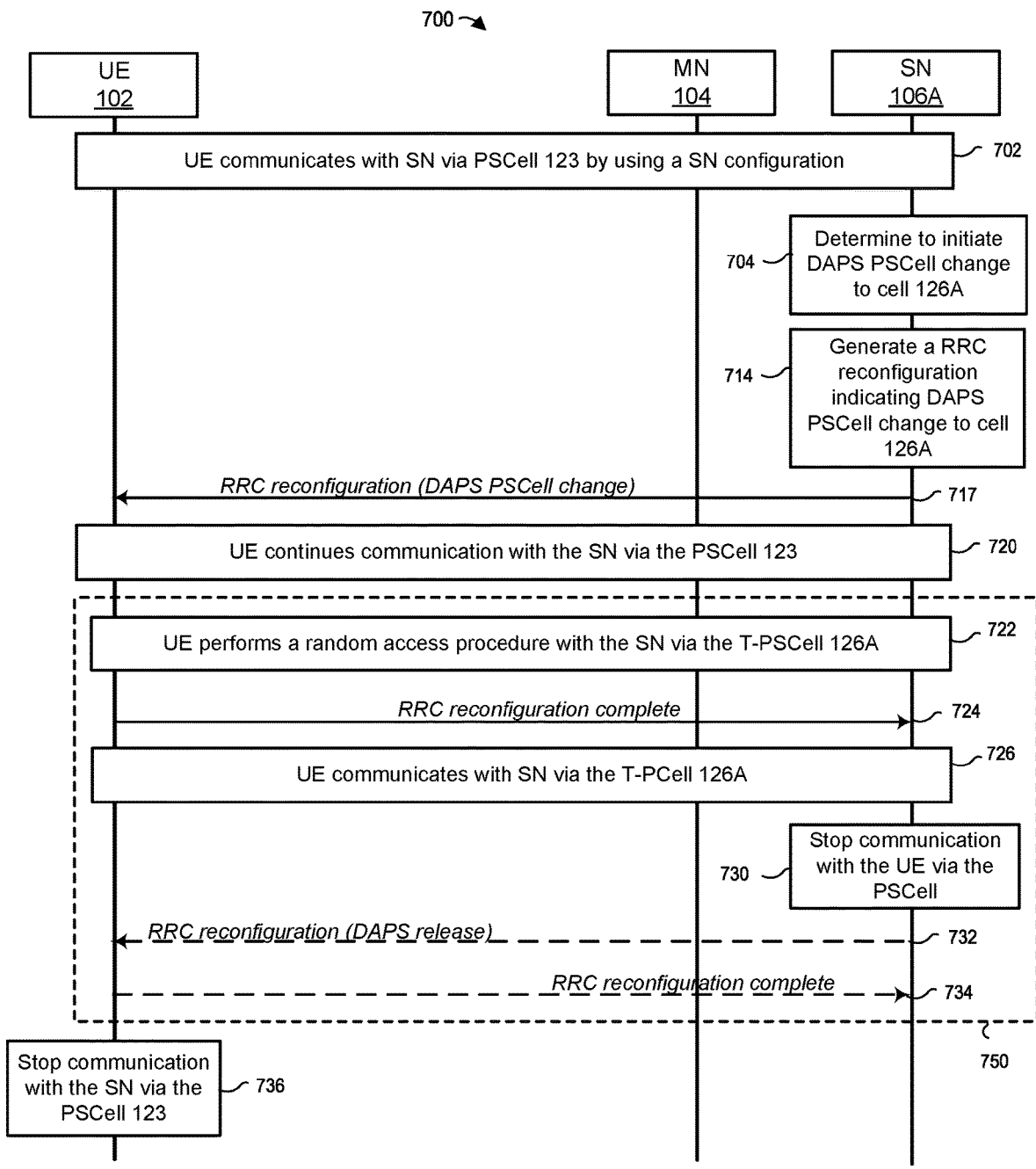
FIG. 7 is a messaging diagram of an example scenario in which an SN of the RAN initiates a DAPS PSCell change procedure for a UE, from a source cell of the SN to a target cell of the SN.
Figure 8:
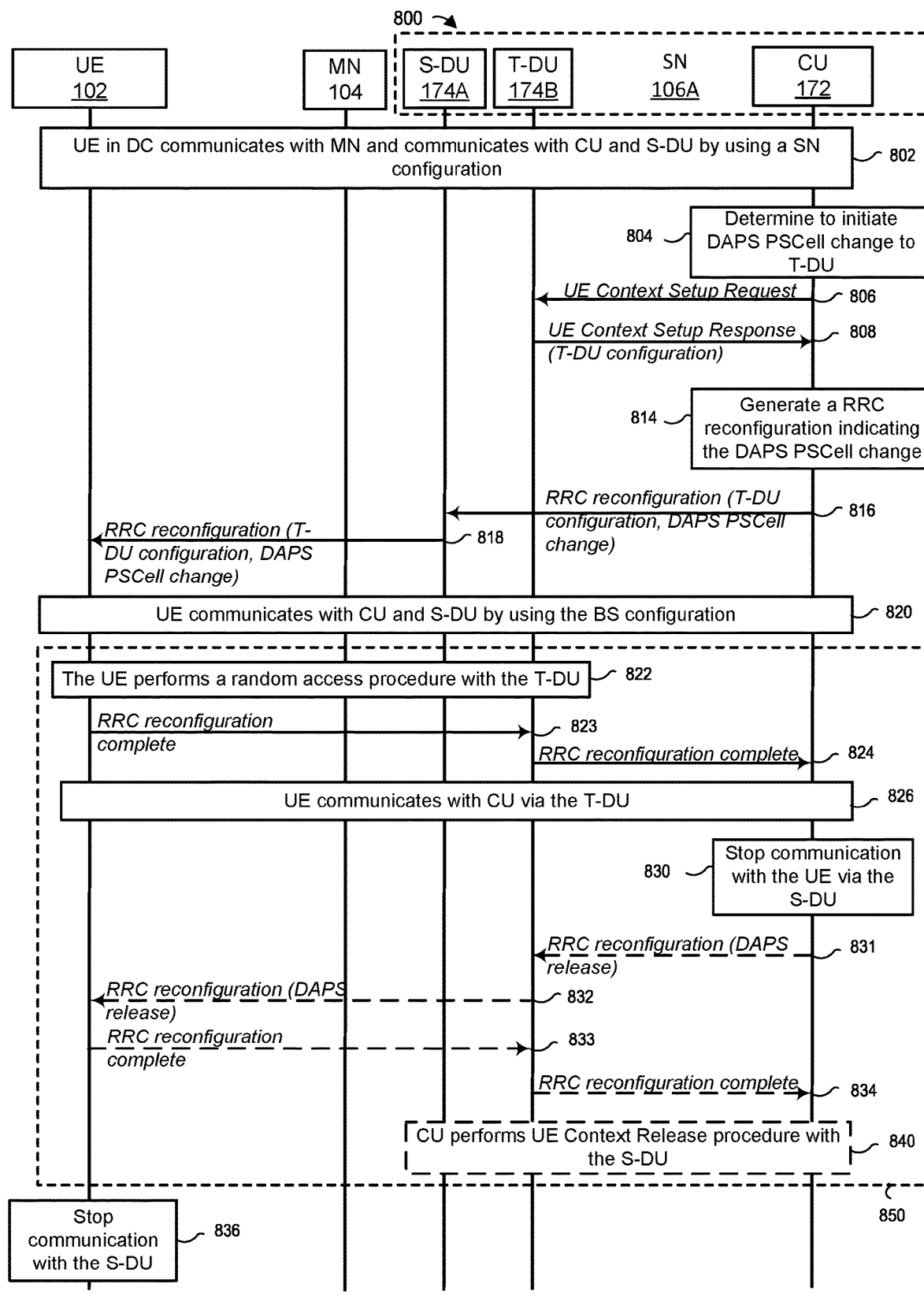
FIG. 8 is a messaging diagram of an example scenario in which a RAN prepares a UE to perform DAPS PSCell change, from a source DU of a base station of the RAN to a target DU of the base station.

In particular, FIG. 3 through FIG. 5 correspond to DAPS handover scenarios in which a base station initiates a DAPS handover procedure for a UE. FIG. 6 through FIG. 8 correspond to DAPS PSCell change scenarios in which a base station initiates a DAPS PSCell change procedure for a UE.

Referring first to FIG. 3, according to a DAPS handover scenario 300, the base station 104 operates as a source base station (S-BS) for the UE 102, and the base station 106B operates as a target base station (T-BS).

Initially, the UE 102 communicates 302 data (e.g., uplink (UL) data PDUs and/or downlink (DL) data PDUs) with the S-BS 104 via N cells using carrier aggregation (CA), where N is a whole number greater than one, by using an S-BS configuration. The N cells include PCell 124 and one or more secondary cells (SCells), such as cell 122. In some scenarios, the UE 102 communicates 302 data in SC with the S-BS 104, or communicates 302 data in DC with the S-BS 104 operating as an MN and an SN (e.g., the base station 106A) not shown in FIG. 3.

Later in time, the S-BS 104 determines 304 to initiate DAPS handover for the T-BS 106B and the UE 102 to communicate, e.g., blindly or in response to detecting a suitable event. For example, the determination 304 can occur in response to the S-BS 104 receiving one or more measurement results from the UE 102 that are above (or below) one or more predetermined thresholds, or calculating a filtered result (from the measurement result(s)) that is above (or below) a predetermined threshold. In another example, the suitable event can be that the UE 102 is moving toward the T-BS 106B. In yet another example, the suitable event can be one or more measurement results, generated or obtained by the S-BS 104 based on measurements of signals received from the UE 102, being above (or below) one or more predetermined thresholds.

In response to the determination 304, the S-BS 104 transmits 306 an RRC reconfiguration message to the UE 102 to configure the UE 102 to release M cells, where M is a whole number less than N (i.e., 0<M<N). The M cells can be one, some, or all of the SCells covered by the S-BS 104. In response to the RRC reconfiguration message, the UE 102 releases 308 the M cells (i.e., the UE 102 disconnects from the M cells). As a result, RF chain(s) or transceiver(s) of the UE 102 that were previously operating in communicating with the S-BS 104 via the M cells become available for use to communicate with the T-BS 106B during and after a successful DAPS handover, while those that are communicating with the S-BS 104 via the N-M cells are still in use. In releasing 308 the M cells, the UE 102 and the S-BS 104 update the S-BS configuration by excluding configurations relevant to the released M cells, and continue 309 communicating with each other (i.e., via N-M cells) by using the updated S-BS configuration. In some implementations, if the RRC reconfiguration message also includes an indication to update (e.g., adds, modifies or releases) configuration parameters not relevant to the M cells, the UE 102 and the S-BS 104 can update the S-BS configuration accordingly. The UE 102 then transmits 310 an RRC reconfiguration complete message to the S-BS 104.

In some implementations, if the UE 102 at event 302 communicates data with the S-BS 104 via P cells, where 0<P<N−M, events 306, 308, 309, and 310 may be omitted.

After determining 304 to initiate DAPS handover, the S-BS 104 also sends 312 a Handover Request message to the T-BS 106B. In response, the T-BS 106B generates 314 a handover command message that includes a DAPS handover configuration or an indication for the DAPS handover configuration in a field or an IE (e.g., a dapsConfig field, a dapsHO-Config field, a daps-HO field or a daps-HO-Config field), includes the handover command message in a Handover Request Acknowledge message, and sends 316 the Handover Request Acknowledge message to the S-BS 104. In turn, the S-BS 104 transmits 318 the handover command message to the UE 102. The handover command message also includes one or more random access configurations needed by the UE 102 to handover to the T-BS 106B, and in some implementations, includes additional fields, such as a mobility field (e.g., mobilityControlInfo field or a reconfigurationWithSync field), which can include some or all of the random access configurations.

The DAPS handover configuration enables the UE 102 to use a DAPS (e.g., DAPS 200) to communicate with the S-BS 104 (using the updated S-BS configuration) and T-BS 106B (during and after a successful DAPS handover). As such, in response to receiving 318 the handover command message, the UE 102 and the S-BS 104 continue 320 communicating with each other using the updated S-BS configuration while the UE 102 attempts to handover to the T-BS 106B in accordance with the handover command message. In attempting to perform the DAPS handover, the UE 102 initiates 322 a random access procedure with the T-BS 106B via a target cell (e.g., PCell 126B) covered by the T-BS 106B, e.g., by using one or more random access configurations in the handover command message received 318 from the S-BS 104. After gaining access to a channel, the UE 102 transmits 324 a handover complete message to the T-BS 106B via the target cell during or after successfully completing the random access procedure. After the T-BS 106B identifies the UE 102 during the random access procedure, the UE 102 communicates 326 control signals and data (e.g., UL data PDUs or DL data PDUs) with the T-BS 106B via the target cell by using the DAPS handover configuration in or otherwise indicated in the handover command message. The DAPS handover configuration enables the UE 102 to continue communicating with the S-BS 104 while simultaneously communicating with the T-BS 106B.

In response to identifying the UE 102 during the random access procedure or receiving 324 the handover complete message, the T-BS 106B sends 328 a Handover Success message to the S-BS 104. After receiving the Handover Success message, the S-BS 104 stops 330 communicating with the UE 102. In some implementations, the S-BS 104 can transmit a sequence number (SN) Status Transfer message to the T-BS 106B in response to the Handover Success message. In some implementations, before or after transmitting the Handover Success message, the T-BS 106B can send an explicit stop indication message to the S-BS 104, which in turn can stop 330 communicating with the UE 102 in response to the explicit stop indication. In other implementations, the S-BS 104 stops 330 communicating with the UE 102 in response to generating the SN Status Transfer message. After receiving the SN Status Transfer message from the S-BS 104, the T-BS 106B can send a Context Release message to the S-BS 104 to release a UE Context of the UE 102.

As the UE 102 no longer needs to use the DAPS to continue communicating with the S-BS 104, the T-BS 106B can send 332 an RRC reconfiguration message that includes a DAPS release indicator to the UE 102, e.g., via the target cell, before transmitting 328 the Handover Success message, after transmitting 328 the Handover Success message, or simultaneously with the Handover Success message. In response to the RRC reconfiguration message, the UE 102 can transmit 334 an RRC reconfiguration complete message to the T-BS 106B and stop 336 communicating (i.e., UL and/or DL communication) with the S-BS 104. In some implementations, in response to the DAPS release indicator, a RF chip, receiver, or a transceiver of the UE 102 used to communicate with the S-BS 104 during the DAPS handover can enter into low power consumption mode, sleep mode, or be turned off entirely if the DAPS handover is an inter-frequency handover. The events 322, 324, 326, 328, 330, 332, 334 are collectively referred to in FIG. 3 as the DAPS handover and DAPS release procedure 350.

In some implementations, the S-BS 104 determines to configure the UE 102 to release M cells according to a DAPS handover capability in a UE Capability information element (IE) of a message (e.g., in a UECapabilityInformation message) received from the UE 102, the CN 110 (e.g., via a S1 or NG interface message), or another base station (e.g., the base station 106A, the base station 106B, or other base station not shown in FIG. 1A) via an X2 or Xn interface. The S-BS 104 can include the UE Capability IE in the Handover Request message in event 312 so that the T-BS 106B is aware of the DAPS handover capability of the UE 102. The UE Capability IE can be a UE-NR-Capability IE as defined in 3GPP TS 38.331 or a UE-EUTRA-Capability IE as defined in 3GPP TS 36.331.

For example, if the DAPS handover capability indicates that the UE 102 is not capable of CA, the S-BS 104 can configure the UE 102 to release all SCells (i.e., N−1 SCells). In another example, if the DAPS handover capability indicates that the UE 102 is capable of communicating with the S-BS 104 using CA in N-P cells associated to one or more particular frequency bands during DAPS handover, where P is a whole number greater than or equal to 0 and less than or equal to M (i.e., 0<P<M), the S-BS 104 can configure the UE 102 to release M cells if N−M cells are associated to some or all of the one or more particular frequency bands. In yet another example, if the DAPS handover capability indicates that the UE 102 is not capable of DAPS handover, the S-BS 104 can perform a non-DAPS handover preparation procedure with the T-BS 106B. In such an example, instead of generating the handover command message that includes the DAPS handover configuration (or an indication for the DAPS handover configuration) at event 314, the T-BS 106B generates a handover command message that excludes the DAPS handover configuration (or the indication for the DAPS handover configuration).

In other implementations, the S-BS 104 determines to configure the UE 102 to release N−1 cells if the S-BS 104 is unaware whether the UE 102 is capable of DAPS handover with CA. The S-BS 104 can ensure that the UE 102 can perform DAPS handover by releasing the N−1 cells.

Inter-frequency DAPS Handover

In some implementations, the DAPS handover capability indicates that the UE 102 is capable of inter-frequency DAPS handover for one or more frequency bands. In one implementation, the DAPS handover capability can further specify that the UE 102 is capable of inter-frequency DAPS handover for frequency division duplex (FDD) and/or time division duplex (TDD) mode, using one or more indicators included in the DAPS handover capability. In another implementation, the UE Capability IE can specify that the UE 102 is capable of inter-frequency DAPS handover for FDD and/or TDD mode, using an inter-frequency handover capability field/IE included in the UE Capability IE. Therefore, the S-BS 104 or T-BS 106B can determine whether the UE 102 is capable of inter-frequency DAPS handover for one or more frequency bands, and if further specified, for FDD and/or TDD mode, according to the DAPS handover capability and/or the UE Capability IE. If the UE Capability IE does not include the DAPS handover capability, irrespective of including the inter-frequency handover capability field/IE, the S-BS 104 or T-BS 106B determines that the UE 102 is capable of the inter-frequency non-DAPS handover.

In some implementations, the UE Capability IE includes DC/CA band combination field(s)/IE(s) to indicate that the UE 102 is capable of performing CA on one or more bands (e.g., FDD band(s) only, TDD band(s) only, FDD band(s) and TDD band(s)). The CA band combination field(s)/IE(s) can designate respective CA band combination(s) (e.g., a first CA band combination and a second CA band combination), each CA band combination indicating the band(s). In one implementation, the DAPS handover capability can be included in the CA band combination field(s)/IE(s) to indicate that the UE 102 is capable of the inter-frequency DAPS handover associated to the CA band combination(s) indicated in the CA band combination field(s)/IE(s). Thus, support of the DAPS handover can be on a per CA band combination basis. For example, if the UE 102 supports DAPS handover associated to a first CA band combination but not a second CA band combination, the UE 102 includes the DAPS handover capability in a first CA band combination field/IE designating the first CA band combination, and excludes the DAPS handover capability in a second CA band combination field/IE designating the second CA band combination. Therefore, the S-BS 104 or T-BS 106B can determine whether the UE 102 is capable of inter-frequency DAPS handover according to the DAPS handover capability and the CA band combination field(s)/IE(s).

In an example scenario, cell 124 operates on a first DL carrier frequency and a first UL carrier frequency, and cell 126B operates on a second DL carrier frequency and a second UL carrier frequency. Cells 124 and 126B can be either FDD cells or TDD cells. As examples, if the first DL carrier frequency and the first UL carrier frequency belong to a TDD band (i.e., the cell 124 is a TDD cell), the first DL carrier frequency and the first UL carrier frequency are the same or overlapped carrier frequencies. If the first DL carrier frequency and the first UL carrier frequency belong to an FDD band (i.e., the cell 124 is an FDD cell), the DL carrier frequency and the UL carrier frequency are different carrier frequencies. If the second DL carrier frequency and the second UL carrier frequency belong to a TDD band (i.e., the cell 126B is a TDD cell), the second DL carrier frequency and the second UL carrier frequency are the same carrier frequency. If the second DL carrier frequency and the second UL carrier frequency belong to an FDD band (i.e., the cell 126B is an FDD cell), the second DL carrier frequency and the second UL carrier frequency are different carrier frequencies. If the UE 102 is capable of the inter-frequency DAPS handover, the S-BS 104 requests the T-BS 106B to configure cell 126B in the Handover Request message for the inter-frequency DAPS handover, and the T-BS 106B configures the cell 126B in the handover command message. Similarly, if the UE 102 is capable of the inter-frequency non-DAPS handover, the S-BS 104 requests the T-BS 106B to configure cell 126B in the Handover Request message for the inter-frequency non-DAPS handover, and the T-BS 106B configures the cell 126B in the handover command message.

FDD-TDD DAPS Handover

In some implementations, the DAPS handover capability indicates that the UE 102 is capable of FDD-TDD DAPS handover (i.e., DAPS handover from an FDD cell to a TDD cell and/or vice versa). In one implementation, the DAPS handover capability can further specify that the UE 102 is capable of FDD-TDD DAPS handover using one or more indicators included in the DAPS handover capability. For example, the DAPS handover capability can include a single indicator indicating that the UE 102 is capable of FDD-TDD DAPS handover from an FDD cell (in a specific or any FDD band supported by the UE 102) to a TDD cell (in a specific or any TDD band supported by the UE 102), and/or vice versa. In other implementations, an FDD-TDD handover capability field/IE included in the UE Capability IE can indicate that the UE 102 is capable of the FDD-TDD DAPS handover. The S-BS 104 or T-BS 106 can determine whether the UE 102 is capable of FDD-TDD DAPS handover according to the DAPS handover capability and/or the FDD-TDD handover capability field/IE. If the UE Capability IE does not include the DAPS handover capability, irrespective of including the FDD-TDD handover capability field/IE, the S-BS 104 or T-BS 106 determines that the UE 102 is capable of the FDD-TDD non-DAPS handover.

In an example scenario, one of the cells 124 and 126B is a TDD cell, and the other is an FDD cell. If the UE 102 is capable of the FDD-TDD DAPS handover, the S-BS 104 requests the T-BS 106B to configure cell 126B in the Handover Request message for the FDD-TDD DAPS handover, and the T-BS 106B configures the cell 126B in the handover command message. Similarly, if the UE 102 is capable of the FDD-TDD non-DAPS handover, the S-BS 104 requests the T-BS 106B to configure cell 126B in the Handover Request message for the FDD-TDD non-DAPS handover, and the T-BS 106B configures the cell 126B in the handover command message.

Intra-frequency DAPS Handover

In some implementations, the DAPS handover capability indicates that the UE 102 is capable of intra-frequency DAPS handover for one or more frequency bands. In another implementation, the UE Capability IE can specify that the UE 102 is capable of intra-frequency DAPS handover, using an indication included in the UE Capability IE. Therefore, the S-BS 104 or T-BS 106B can determine whether the UE 102 is capable of intra-frequency DAPS handover according to the DAPS handover capability and/or the UE Capability IE. For example, if the UE Capability IE includes an indication that the UE 102 does not support the intra-frequency DAPS handover, or if the UE Capability IE does not include the DAPS handover capability, the S-BS 104 or T-BS 106 determines that the UE 102 is capable of intra-frequency non-DAPS handover. As another example, if the UE Capability IE includes the DAPS handover capability and an indication that the UE 102 supports intra-frequency DAPS handover, the S-BS 104 or T-BS 106B determines that the UE 102 is capable of the intra-frequency DAPS handover.

In an example scenario, cells 124 and 126B are either TDD cells or FDD cells and operate on the same or overlapped carrier frequencies. If the UE 102 is capable of the intra-frequency DAPS handover, the S-BS 104 can request the T-BS 106B to configure the cell 126B in the Handover Request message for the intra-frequency DAPS handover, and the T-BS 106B configures the cell 126B in the handover command message. Similarly, if the UE 102 is capable of the intra-frequency non-DAPS handover, the S-BS 104 requests the T-BS 106B to configure cell 126B in the Handover Request message for the intra-frequency non-DAPS handover, and the T-BS 106B configures the cell 126B in the handover command message.

Inter-RAT DAPS Handover

In some implementations, the DAPS handover capability indicates that the UE 102 is capable of inter-RAT DAPS handover using one or more indicators. For example, the DAPS handover capability can include a single indicator indicating that the UE 102 is capable of inter-RAT DAPS handover from a cell of a first RAT (or a cell in a specific band in the first RAT) to a cell of a second RAT (or a cell in a specific band in the second RAT). In other implementations, the UE Capability IE can specify that the UE 102 is capable of inter-RAT DAPS handover, using an inter-RAT handover capability field/IE included in the UE Capability IE that indicates that the UE 102 is capable of inter-RAT DAPS handover from a first RAT to a second RAT. Therefore, the S-BS 104 or T-BS 106 can determine whether the UE 102 is capable of inter-RAT DAPS handover according to the DAPS handover capability and/or the UE Capability IE. If the UE Capability IE does not include the DAPS handover capability, irrespective of including the inter-RAT handover capability field/IE, the S-BS 104 or T-BS 106 determines that the UE 102 is capable of the inter-RAT non-DAPS handover.

In an example scenario, cell 124 operates in the first RAT (e.g., EUTRA) and cell 126B operates in the second RAT (e.g., NR). If the UE 102 is capable of the inter-RAT DAPS handover, the S-BS 104 can request the T-BS 106B to configure the cell 126B in the Handover Request message for the inter-RAT DAPS handover, and the T-BS 106B configures the cell 126B in the handover command message. Similarly, if the UE 102 is capable of the inter-RAT non-DAPS handover, the S-BS 104 requests the T-BS 106B to configure cell 126B in the Handover Request message for the inter-RAT non-DAPS handover, and the T-BS 106B configures the cell 126B in the handover command message.

Synchronous or Asynchronous DAPS Handover

In some implementations, the DAPS handover capability indicates that the UE 102 is capable of synchronous DAPS handover, asynchronous DAPS handover, or both, using one or more indicators. For example, the DAPS handover capability can include a "synchronous" indicator or an "asynchronous" indicator indicating that the UE 102 is capable of synchronous or asynchronous DAPS handover, respectively. In another example, the DAPS handover capability can include the "synchronous" indicator indicating that the UE 102 is only capable of synchronous DAPS handover, or include the "asynchronous" indicator indicating that the UE 102 is capable of both synchronous DAPS handover and asynchronous DAPS handover.

The "synchronous" and/or "asynchronous" indicators can be generic for or associated to all types of DAPS handover discussed above (e.g., intra-frequency DAPS handover, inter-frequency DAPS handover, FDD-TDD DAPS handover, and/or inter-RAT DAPS handover) that the UE 102 supports. If the UE 102 only supports synchronous DAPS handover for all of the DAPS handover types that the UE supports (i.e., the UE 102 does not support asynchronous DAPS handover), and the S-BS 104 and T-BS 106B are asynchronous base stations, the S-BS 104 can send a Handover Request message to the T-BS 106B to request the T-BS 106B to prepare non-DAPS handover for the UE 102, and the T-BS 106B can configure the non-DAPS handover in the handover command message, in one implementation. In another implementation, the S-BS 104 can send a Handover Request message to the T-BS 106B to request the T-BS 106B to prepare DAPS handover for the UE 102, but the T-BS 106B can still configure the non-DAPS handover in the handover command message, and optionally notify the S-BS 104 of the non-DAPS handover for the UE 102. Otherwise, if the UE 102 supports asynchronous DAPS handover, the S-BS 104 can send a Handover Request message to the T-BS 106B to request the T-BS 106B to prepare DAPS handover for the UE 102.

In one scenario, the S-BS 104 determines that the T-BS 106B is an asynchronous base station and subsequently requests the T-BS 106B to prepare non-DAPS handover for a particular UE (e.g., UE 102) that only supports synchronous DAPS handover, and DAPS handover for a particular UE that only supports asynchronous DAPS handover. In another scenario, the T-BS 106B determines that the S-BS 104 is an asynchronous base station and subsequently prepares non-DAPS handover for a particular UE that only supports synchronous DAPS handover, and DAPS handover for a particular UE that only supports asynchronous DAPS handover. In either scenario, the T-BS 106B can determine whether the UE supports synchronous DAPS handover and/or asynchronous DAPS handover based on a DAPS capability in a UE Capability IE of the particular UE received from the S-BS 104.

Alternatively, the "synchronous" and/or "asynchronous" indicators can be specific for or associated to a particular type of DAPS handover discussed above that the UE 102 supports. For example, if the UE 102 supports inter-frequency DAPS handover and FDD-TDD DAPS handover, the UE 102 indicates first "synchronous" and/or "asynchronous" indicators for the inter-frequency DAPS handover and second "synchronous" and/or "asynchronous" indicators for the FDD-TDD DAPS handover. If the UE 102 only supports synchronous DAPS handover for a specific DAPS handover type, and the S-BS 104 and the T-BS 106B are asynchronous base stations that support the specific DAPS handover type, the S-BS 104 can send a Handover Request message to the T-BS 106B to request the T-BS 106B to prepare non-DAPS handover for the UE 102, in one implementation. In another implementation, the S-BS 104 can send a Handover Request message to the T-BS 106B to request the T-BS 106B to prepare DAPS handover for the UE 102, but the T-BS 106B can still configure the non-DAPS handover in the handover command message, and optionally notify the S-BS 104 of the non-DAPS handover for the UE 102.

In some implementations, the RRC reconfiguration procedure (i.e., events 306, 308, 309, 310) and the DAPS handover preparation procedure (e.g., events 312, 314, 316) can be performed in parallel, or in sequence. For example, the S-BS 104 sends 312 the Handover Request message before or after transmitting 306 the RRC reconfiguration message or receiving 310 the RRC reconfiguration complete message, in one implementation. In another implementation, the S-BS 104 sends 312 the Handover Request message and sends 306 the RRC reconfiguration message at the same time.

In one implementation, the UE 102 stops transmitting and retransmitting UL data PDUs and/or control signals on PUCCH(s) to the S-BS 104 after successfully completing 322 the random access procedure. In another implementation, the UE 102 stops transmitting new UL data PDUs to the S-BS 104 but continues to retransmit UL data PDU(s) to the S-BS 104 if requested by the S-BS 104 after successfully completing 322 the random access procedure, until event 336 occurs. In such implementations, the UE 102 can continue DL communication (i.e., receiving control signals, reference signals, DL PDUs, etc.) with the S-BS 104 and/or transmit control signals (e.g., HARQ acknowledgement, HARQ negative acknowledgement and/or channel state information) on PUCCH(s) to the S-BS 104 until event 332 occurs or a DAPS release timer at the UE 102 expires. In one implementation, the T-BS 106B configures a time value for the DAPS release timer in the handover command message or the RRC reconfiguration message in event 332. Upon receiving 318 the handover command message or receiving 332 the RRC reconfiguration message, the UE 102 starts the DAPS release timer. If the DAPS release timer expires, the UE 102 stops 336 communicating with the S-BS 104. Alternatively, the UE 102 uses a predetermined timer value if the T-BS 106B does not include the timer value in the handover command message or the RRC reconfiguration message. The T-BS 106B can include a timer value in the Handover Success message, which can be the same timer value in the RRC reconfiguration message in event 332 or larger than the timer value in the handover command message in event 318.

In some implementations and scenarios, the UE 102 exchanges RRC message with the S-BS 104 via SRB(s) (e.g., SRB1, SRB2 and/or SRB4) using the updated S-BS configuration before receiving the handover command message. The S-BS 104 can also include a DRB configuration in the updated S-BS configuration. The T-BS 106B includes multiple configuration parameters in the handover command message to configure radio resources for the UE 102 to communicate with the T-BS 106B via target PCell 126B. The multiple configuration parameters can configure zero, one, or more radio bearers, including SRB(s) (e.g., SRB1, SRB2 and/or SRB4) and/or DRB(s). The UE 102 can exchange RRC messages with the T-BS 106B via the SRB(s) (i.e., SRB(s) for the target). The T-BS 106B can associate or otherwise specify the DAPS handover configuration to a radio bearer (e.g., DRB), such as by including the DAPS handover configuration in a DRB configuration (e.g., DRB-ToAddMod IE) in the handover command message. After the UE 102 receives the handover command message and while the UE 102 is performing the DAPS procedure, the UE 102 suspends the SRB(s) with the S-BS 104 (i.e., SRB(s) for the source). If the UE 102 fails the random access procedure at event 322, the UE 102 can perform a RRC connection reestablishment procedure with the S-BS 104 or the T-BS 106B. The UE 102 resumes one or all of the SRB(s) associated with the S-BS 104 in response to the RRC connection reestablishment procedure. The SRB(s) associated with the S-BS 104 and the SRB(s) associated with the T-BS 106B can be the same or different instances. If the SRBs are different instances, the UE 102 releases the SRB(s) associated with the T-BS 106B in response to the RRC connection reestablishment procedure. If the SRBs are different instances, the UE 102 releases the SRB(s) associated with the S-BS 104 after or in response to the success completion of the random access procedure or the DAPS release at event 332.

In some implementations, the T-BS 106B can configure SCell(s) of the T-BS 106B in the multiple configuration parameters in the handover command message to configure radio resources for the UE 102 to communicate with the T-BS 106B via the SCell(s). In one such implementation, the T-BS 106B can include one or more SCell configurations configuring the SCell(s) and their states in the handover command message, and the UE 102 can determine the states of the SCell(s) according to the one or more SCell configurations. Particularly, the T-BS 106B can configure the SCell(s) to first be in deactivated state(s) while the UE 102 performs the DAPS procedure, and then transition to activated state(s) after releasing the DAPS at event 332. The T-BS 106B can transmit RRC message(s), MAC control element(s), or downlink control information (DCI) command(s) to the UE 102 to configure the SCell(s) to be in activated state(s).

In some implementations, while performing the DAPS procedure, the UE 102 keeps an SCell of the S-BS 104 in activated state if the SCell is among the N-M cells, e.g., not released at event 306. The UE 102 can release the SCell of the S-BS 104 in response to the DAPS release at event 332. In other implementations, the T-BS 106B can include a release indication of the SCell of the S-BS 104 in the handover command message that is transmitted to the UE 102, and the UE 102 does not release the SCell in response to the handover command message, and instead releases the SCell in response to the DAPS release at event 332. In yet other implementations, the T-BS 106B can include a release indication of the SCell of the S-BS 104 in the RRC reconfiguration message at event 332, and the UE 102 does not release the SCell of the S-BS 104 in response to the handover command message, and instead releases the SCell in response to the release indication.

In some implementations, the T-BS 106B may not configure an SCell to the UE 102 in the handover command message. The T-BS 106B can later transmit RRC reconfiguration message(s) to the UE 102 to configure SCell(s) of the T-BS 106B. In response, the UE 102 can transmit an RRC reconfiguration complete message to the T-BS 106B via the target PCell 126B or a configured SCell for each of the RRC reconfiguration message(s).

In some implementations, the S-BS 104 transmits the updated S-BS configuration in a Handover Request message to the T-BS 106B, so that the T-BS 106B is aware of any pre-existing configurations known by the UE 102 to determine additional configuration(s) the UE 102 may still need to handover from the S-BS 104 to the T-BS 106B and communicate with the T-BS 106B after the handover. In one implementation, the S-BS 104 includes the updated S-BS configuration in a HandoverPreparationInformation IE (or RRC inter-node message), and includes the HandoverPreparationInformation IE in the Handover Request message. In another implementation, the S-BS 104 includes the updated S-BS configuration in an RRC message (e.g., RRC reconfiguration message), includes the RRC message in a HandoverPreparationInformation IE, and then includes the HandoverPreparationInformation IE in the Handover Request message. If the T-BS 106B determines that configuration(s) in addition to the updated S-BS configuration are needed by the UE 102, the T-BS 106B can include the additional configuration(s) in the handover command message.

In some implementations, the updated S-BS configuration can include a CellGroupConfig IE that configures the PCell 124 and can configure zero, one, or more SCells of the S-BS 104. The updated S-BS configuration can be an RRCReconfiguration message, RRCReconfiguration-IEs, or the CellGroupConfig IE conforming to 3GPP TS 38.331, or an RRCConnectionReconfiguration message or RRCConnectionReconfiguration-IEs conforming to 3GPP TS 36.331. In some implementations, the updated S-BS configuration can include configurations in the CellGroupConfig 1E, RRCReconfiguration-IEs or RRCConnectionReconfiguration-IEs.

In some implementations, the S-BS 104 consists of CU 172 and one or more DUs 174 as shown in FIG. 1B. The DU(s) 174 can generate the S-BS configuration or at least a portion of the S-BS configuration, and send the S-BS configuration (or portion) to the CU 172. The CU 172 can generate the remainder of the S-BS configuration if the DU 174 only generated a portion of the S-BS configuration. The DU(s) 174 can communicate with the UE 102 via the portion of the S-BS configuration, and the CU 172 can communicate with the UE 102 via the remainder of the S-BS configuration, in one implementation. For example, the S-BS configuration (or portion) generated by the DU 174 can include the one or more random access configurations, a physical downlink control channel (PDCCH) configuration, physical uplink control channel (PUCCH) configuration, etc. The remainder of the S-BS configuration generated by the CU 172 can include an SRB configuration, a DRB configuration, a security configuration, and/or a measurement configuration. In other implementations, the DU 174 can include a cell group configuration (e.g., CellGroupConfig 1E) in the S-BS configuration, and the CU 172 can include a radio bearer configuration (RadioBearerConfig IE) in the S-BS configuration. The DU(s) 174 can include one or more configuration parameters to update the S-BS configuration in the RRC reconfiguration message, so that the DU(s) 174 and the UE 102 can continue communicating with each other by using the updated S-BS configuration (e.g., at event 309). The DU(s) 174 can send the one or more configuration parameters to the CU 172.

In some implementations, the T-BS 106 consists of CU 172 and one or more DUs 174 as shown in FIG. 1B. The UE 102 can perform 322 the random access procedure with at least one of the DU(s) 174. The DU 174 can include some configurations (e.g., one or more random access configurations, a physical downlink control channel (PDCCH) configuration, physical uplink control channel (PUCCH) configuration) in the handover command message and send the configurations to the CU 172. The CU 172 can include other configurations (e.g., an SRB configuration, a DRB configuration, a security configuration and/or a measurement configuration) in the handover command message. In other implementations, the DU 174 can include a cell group configuration (e.g., CellGroupConfig IE) in the handover command message, and the CU 172 can include a radio bearer configuration (e.g., RadioBearerConfig IE) in the handover command message.

In some implementations, if the S-BS 104 is a gNB, the handover command message can be an RRCReconfiguration message, the S-BS configuration can be an RRCReconfiguration-IEs as defined in 3GPP TS 38.331, the handover complete message can be an RRCReconfigurationComplete message, and the RRC reconfiguration message and the RRC reconfiguration complete message can be an RRCReconfiguration message and an RRCReconfigurationComplete message, respectively.

In some implementations, if the S-BS 104 is an eNB or an ng-eNB, the handover command message can be an RRCConnectionReconfiguration message, the S-BS configuration can be an RRCConnectionReconfiguration-r8-IEs as defined in 3GPP TS 36.331, the handover complete message can be an RRCConnectionReconfigurationComplete message, and the RRC reconfiguration message and the RRC reconfiguration complete message can be an RRCConnectionReconfiguration message and an RRCConnectionReconfigurationComplete message, respectively.

In some implementations, the S-BS 104 can combine the RRC reconfiguration message (at event 306) and the handover command message (at event 318) into an RRC message. For example, the S-BS 104 can generate an RRC message (e.g., an RRC reconfiguration message) for releasing the M cells that includes the handover command message, and transmit the RRC message to the UE 102 at event 318. The S-BS 104 can include the handover command message in a DAPS handover related field/IE. The handover command message may or may not include a DAPS handover related field/IE to indicate the DAPS handover. If the RRC message is an RRC reconfiguration message, the UE 102 need not transmit an RRC reconfiguration complete message to the S-BS 104 in response to the RRC reconfiguration message. If the RRC message and the handover command message are RRC reconfiguration messages, the UE 102 can include a transaction identifier in the handover complete message (i.e., a RRC reconfiguration complete message) and set the transaction identifier to a value identical to the value of a transaction identifier in the handover command message rather than to a value of a transaction identifier in the RRC message. Accordingly, the RRC message and the handover command message may have different transaction identifier values, and therefore the T-BS 106B can determine that the handover complete message is associated to the handover command message based on the identical transaction identifiers.

In FIG. 4, in a DAPS handover scenario 400, the base station 104 operates as an MN for the UE 102, the base station 106A operates as an SN for the UE 102, and the base station 106B operates as a T-BS for the UE 102.

Initially, the UE 102 in DC communicates 402 data (e.g., UL data PDUs and/or DL data PDUs) with the MN 104 and SN 106A, e.g., by using an MN configuration (similar to the S-BS configuration in event 302) and an SN configuration, respectively.

Later in time, the MN 104 determines 404 to initiate DAPS handover for the T-BS 106B and the UE 102 to communicate, e.g., blindly or in response to detecting a suitable event, similar to those described with respect to FIG. 3.

In response to the determination 404, the MN 104 performs 405 an SN Release procedure with the SN 106A (e.g., the MN 104 sends an SN Release Request message to the SN 106A, which in turn sends an SN Release Request Acknowledge message to the MN 104), and transmits 406 an RRC reconfiguration message to the UE 102 to configure the UE 102 to release the SN 106A. The MN 104 can transmit the RRC reconfiguration message before or after transmitting the SN Release Request message or receiving the SN Release Request Acknowledge message.

In response to receiving the RRC reconfiguration message, the UE 102 stops 408 communicating with the SN 106A. As a result, RF chain(s) or transceiver(s) of the UE 102 that were previously operating in communicating with the SN 106A become available for use to communicate with the T-BS 106B during and after a successful DAPS handover, while those that are communicating with the MN 104 are still in use. The UE 102 and the MN 104 continue 409 communicating with each other (i.e., in SC), similar to event 309.

The UE 102 then transmits 410 an RRC reconfiguration complete message to the MN 104, and releases the SN configuration, in some implementations.

After determining 404 to initiate DAPS handover, the MN 104 also sends 412 a Handover Request message to the T-BS 106B, similar to event 312. In response, the T-BS 106B generates 414 a handover command message, similar to event 314, and sends 416 the Handover Request Acknowledge message to the MN 104, similar to event 316. In turn, the MN 104 transmits 418 the handover command message to the UE 102, similar to event 318.

In response to receiving 418 the handover command message, the UE 102 and the MN 104 continue 420 communicating with each other while the UE 102 attempts to handover to the T-BS 106B in accordance with the handover command message, similar to event 320. Subsequently, the UE 102, MN 104, and T-BS 106B collectively perform a DAPS handover and DAPS release procedure 450, similar to procedure 350. As a result, the UE 102 stops 436 communicating with the MN 104, similar to event 336.

In some implementations, if the DAPS handover capability of the UE 102 indicates that the UE 102 is not capable of communicating in DC but capable of CA, the MN 104 can configure the UE 102 to communicate in SC with the MN 104 via N cells. Therefore, the MN 104 can effectively serve as the S-BS 104 as described above with respect to FIG. 3.

In other implementations, the S-BS 104 determines to configure the UE 102 to release the SN if the S-BS 104 is unaware whether the UE 102 is capable of DAPS handover with DC. The S-BS 104 can ensure that the UE 102 can perform DAPS handover by releasing the SN for the UE 102 at event 406.

In some implementations, the S-BS 104 may combine the RRC reconfiguration message (at event 406) and the handover command message (at event 410) into an RRC message. For example, the S-BS 104 can generate an RRC message (e.g., an RRC reconfiguration message) for releasing the SN that includes the handover command message, and transmit the RRC message to the UE 102 at event 418. The S-BS 104 can include the handover command message in a DAPS handover related field/IE. The handover command message may or may not include a DAPS handover related field/IE to indicate the DAPS handover. If the RRC message is an RRC reconfiguration message, the UE 102 need not transmit an RRC reconfiguration complete message to the S-BS 104 in response to the RRC reconfiguration message. If the RRC message and the handover command message are RRC reconfiguration messages, the UE 102 can include a transaction identifier in the handover complete message and set the transaction identifier to a value identical to the value of a transaction identifier in the handover command message rather than to a value of a transaction identifier in the RRC message. Accordingly, the RRC message and the handover command message may have different transaction identifier values, and therefore the T-BS 106B can determine that the handover complete message is associated to the handover command message based on the identical transaction identifiers.

In FIG. 5, in a DAPS handover scenario 500, the base station 104 includes a CU 172 for the UE 102, and three DUs 174 that operate as a source DU (S-DU) for the UE 102, a target DU (T-DU) for the UE 102, and a candidate DU (C-DU) for the UE 102, respectively.

Initially, the UE 102 communicates 502 data with CU 172 and S-DU 174A via cell 122 by using a BS configuration.

Later in time, the CU 172 determines 504 to initiate DAPS handover for the T-DU 174B and the UE 102 to communicate via cell 124, e.g., blindly or in response to detecting a suitable event, similar to those described with respect to FIG. 3. For example, the CU 172 initiates DAPS handover in response to measurement result(s) obtained by the CU 172 from measurements on signals received from the UE 102 via S-DU 174A.

In response to the determination 504, the CU 172 sends 506 a UE Context Setup Request message to the T-DU 174B. In response, the T-DU 174B sends 508 a UE Context Setup Response message including a T-DU configuration to the CU 172. In turn, the CU 172 generates 514 a handover command message which includes the T-DU configuration and a DAPS handover configuration or an indication for the DAPS handover configuration in a field or an IE (e.g., a dapsConfig field, a dapsHO-Config field, a daps-HO field or a daps-HO-Config field). Then the CU 172 sends 516 the handover command message to the S-DU 174A, which in turn transmits 518 the handover command message to the UE 102.

The DAPS handover configuration enables the UE 102 to use a DAPS to communicate with the S-DU 174A using the BS configuration as well as T-DU 174B using the T-DU configuration during and after a successful DAPS handover. As such, in response to the handover command message, the UE 102 and the base station 104 continue 520 communicating with each other via cell 122 using the S-DU 174A (by using the BS configuration), while the UE 102 attempts to handover to cell 124 using the T-DU 174B in accordance with the handover command message. In attempting to perform the DAPS handover, the UE 102 initiates 522 a random access procedure with the T-DU 174B, e.g., by using one or more random access configurations in the T-DU configuration. After gaining access to a channel, the UE 102 transmits 523 a handover complete message to the T-DU 174B during or after successfully completing the random access procedure, which in turn sends 524 the handover complete message to the CU 172. After the T-DU 174B identifies the UE 102 during the random access configuration, the UE 102 communicates 526 control signals and data with the CU 172 via the T-DU 174B by using the T-DU configuration included in the handover command message. If the handover command message includes configurations (e.g., DAPS handover configuration) generated by the CU 172, the UE 102 communicates 526 with the CU 172 via the T-DU 174B by using the configurations generated by the CU 172.

After receiving 524 the handover complete message, the CU 172 stops 530 communicating with the UE 102 via the S-DU 174A. The CU 172 can then send 531 an RRC reconfiguration message that includes a DAPS release indicator to the T-DU 174B, which in turn can send 532 the RRC reconfiguration message to the UE 102. In some implementations, the CU 172 stops 530 communicating with the UE 102 after transmitting the RRC reconfiguration message to the T-DU 174B. In response to the RRC reconfiguration message, the UE 102 can transmit 533 an RRC reconfiguration complete message to the T-DU and stop 536 communicating with the S-DU 174A. In turn, the T-DU 174B can send 534 the RRC reconfiguration complete message to the CU 172.

As the UE 102 no longer needs to use the DAPS to continue communicating with the S-DU 174A, the CU 172 can perform 540 a UE Context Release procedure with the S-DU 174A in response to the RRC reconfiguration complete message. Particularly, the CU 172 sends a UE Context Release Command message to the S-DU 174A, which in turn sends a UE Context Release Complete message to the CU 172 and stops communicating with the UE 102. By performing the UE Context Release procedure in response to the RRC reconfiguration complete message, the CU 172 maintains the UE context longer relative to a non-DAPS handover procedure when performing a DAPS handover procedure. The events 522, 523, 524, 526, 530, 531, 532, 533, 534, 540 are collectively referred to in FIG. 5 as the DAPS handover and DAPS release procedure 550.

In some implementations, after successfully completing the random access procedure, the UE 102 can start transmitting UL data PDUs to the CU 172 via the T-DU 174B, stop transmitting and retransmitting UL data PDUs to the S-DU 174A, stop transmitting control signals on PUCCH(s) to the S-DU 174A, stop transmitting new UL data PDUs to the S-DU 174A while continuing to retransmit UL data PDU(s) to the S-DU 174A, continue DL communication with the S-BS 104, and/or keep transmitting control signals to the S-DU 174A until event 532 occurs or the DAPS release timer at the UE 102 expires, as described above with respect to FIG. 3.

In some implementations, the CU 172 performs actions similar to those of the T-BS 106B as discussed above with respect to FIG. 3, such as configuring a time value for the DAPS release timer.

In some implementations, the T-DU configuration can be a CellGroupConfig 1E. In other implementations, the T-DU configuration can include multiple configurations such as physical layer configurations, a MAC configuration, an RLC configuration, and/or the one or more random access configurations.

In some implementations, the T-DU 174B identifies the UE 102 if the T-DU 174B receives a UE identifier (e.g., a cell radio network temporary identifier (C-RNTI)) or a random access preamble from the UE 102 during the random access procedure. The UE identifier or random access preamble can be assigned by the T-DU 174B, in some implementations.

In some implementations, the CU 172 in event 516 can send a UE Context Modification Request message including the handover command message to the S-DU 174A. The S-DU 174A in turn can send a UE Context Modification Response message to the CU 172. In some implementations, the CU 172 can indicate not to stop data transmission to the UE 102 in the Context Modification Request message in response to the determination 504, so that the S-DU 174A continues communicating with the UE 102. For example, the CU 172 may not include a "Transmission Action Indicator" IE in the Context Modification Request message, or include a "Transmission Action Indicator" IE set to "restart" in the Context Modification Request message to indicate not to stop data transmission to the UE 102. In other implementations, the CU 172 can include an IE indicating DAPS handover in the Context Modification Request message so that the S-DU 174A continues communicating with the UE 102. In yet other implementations, the CU 172 in event 516 can send a DL RRC Message Transfer message (instead of the UE Context Modification Request message) including the handover command message to the S-DU 174A.

FIG. 6 through FIG. 8 correspond to DAPS PSCell change scenarios in which a base station initiates a DAPS PSCell change procedure for a UE in SC or in DC. Particularly, FIG. 6 corresponds to DAPS PSCell change scenarios involving an SN change, and FIGS. 7 and 8 correspond to DAPS PSCell change scenarios maintaining the same SN.

Referring first to FIG. 6, according to a DAPS PSCell change scenario 600, the base station 104 operates as an MN for the UE 102, the base station 106A operates as an S-SN for the UE 102, and the base station 106B operates as a T-SN for the UE 102.

Initially, the UE 102 in DC communicates 602 data with the MN 104 via PCell 124 by using an MN configuration, and with the S-SN 106A via PSCell 126A by using an SN configuration.

Later in time, the MN 104 determines 604 to initiate DAPS PSCell change involving an SN change (i.e., MN-initiated DAPS SN addition or change procedure) for the T-SN 106B and the UE 102 to communicate via a T-PSCell 126B, e.g., blindly or in response to detecting a suitable event, similar to those described with respect to FIG. 3.

In response to the determination 604, the MN 104 sends 612 an SN Addition Request message to the T-SN 106B. In response, the T-SN 106B generates 614 an RRC reconfiguration message and a DAPS PSCell change configuration (or a DAPS SN change indicator), and sends 613 the RRC reconfiguration message and the DAPS PSCell change configuration in an SN Addition Request Acknowledge message to the MN 104. In some implementations, in response to the determination 604, the MN 104 sends 615 an SN Release Request message (or alternatively, an SN Modification Request message) to the S-SN 106A to request the S-SN 106A to perform DAPS PSCell change or to continue communicating with the UE 102. In other implementations, the MN 104 may not send an SN Release Request message (or alternatively, an SN Modification Request message) to the S-SN 106A, causing the S-SN 106A to continue communicating with the UE 102 as the S-SN 106A is unaware of the DAPS SN change and therefore behaves as usual.

In response to receiving 615 the SN Release Request message or the SN Modification Request message, the S-SN 106A continues communicating with the UE 102, and subsequently sends 616 an SN Release Request Acknowledge message or an SN Modification Request Acknowledge message to the MN 104, respectively.

In response to receiving 613 the RRC reconfiguration message and the DAPS PSCell change configuration from the T-SN 106B, the MN 104 includes the RRC reconfiguration message and the DAPS PSCell change configuration in an RRC container message, and transmits 617 the RRC container message to the UE 102. In response, the UE 102 transmits 618 an RRC container response message including an RRC reconfiguration complete message to the MN 104. In some implementations, the MN 104 can send 619 an SN Reconfiguration Complete message to the T-SN 106B in response to the RRC container response message. The events 604, 612, 614, 613, 615, 616, 617, 618, 619 are collectively referred to in FIG. 6 as the DAPS PSCell change preparation procedure 660.

The DAPS PSCell change configuration enables the UE 102 to use a DAPS to communicate with the S-SN 106A via PSCell 126A and T-SN 106B via T-PSCell 126B (during and after a successful DAPS PSCell change). As such, in response to receiving 617 the RRC container message, the UE 102 and the S-SN 106A continue 620 communicating with each other (i.e., in DC with the MN 104) while the UE 102 attempts to perform DAPS PSCell change to the T-BS 106B via T-PSCell 126B in accordance with the RRC reconfiguration message included in the RRC container message. In attempting to perform the DAPS PSCell change, the UE 102 initiates 622 a random access procedure with the T-SN 106B via T-PSCell 126B, e.g., by using one or more random access configurations in the RRC reconfiguration message. After the T-SN 106B identifies the UE 102 during the random access procedure (e.g., the UE 102 succeeds the contention resolution), the UE 102 communicates 626 in DC with MN 104 and the T-SN 106B via T-PSCell 126B by using configurations in the RRC configuration message, while continuing to communicate with the S-SN 106A.

The MN 104 can send 628 a UE Context Release message to the S-SN 106A after receiving 618 the RRC container response message. The S-SN 106A stops 630 communicating with the UE 102 in response to or after receiving the UE Context Release message. Alternatively, the S-SN 106A stops 630 communicating with the UE 102 if the S-SN 106A does not receive DL data packets from the CN 110 (e.g., S-GW 112 or UPF 162).

As the UE 102 no longer needs to use the DAPS to continue communicating with the S-SN 106A, the T-SN 106B can transmit 632 an RRC reconfiguration message that includes a DAPS release indicator to the UE 102, e.g., via an SRB (e.g., SRB3) between the UE 102 and the T-SN 106B or via the MN 104. In response to the RRC reconfiguration message, the UE 102 can transmit 634 an RRC reconfiguration complete message to the T-SN 106B via the SRB (e.g., SRB3) between the UE 102 and the T-SN 106B or via the MN 104, and stop 636 communicating with the S-SN 106A. In some implementations, in response to the DAPS release indicator, a RF chip, receiver, or a transceiver of the UE 102 used to communicate with the S-SN 106A during the DAPS PSCell change can enter into low power consumption mode, sleep mode, or be turned off entirely if the DAPS PSCell change is an inter-frequency DAPS PSCell change. The events 622, 626, 628, 630, 632, 634 are collectively referred to in FIG. 6 as the DAPS PSCell change and DAPS release procedure 650.

In some implementations, events 612, 614, and 613 occur before, after, or simultaneously with events 615, 616.

In some implementations, the S-SN 106A sends a first sequence number (SN) Status Transfer message to the MN 104 after or in response to receiving 616 the SN Release Request message or the SN Modification Request message, and in turn, the MN 104 forwards content of the first SN Status Transfer message to the T-SN 106B. The first SN Status Transfer message can convey a DL PDCP sequence number (SN) transmitter status for a DRB as a result of the DAPS PSCell change. The T-SN 106B can configure the DRB using the DAPS PSCell change configuration. In one implementation, the DL PDCP SN transmitter status indicates PDCP SN and hyper frame number (HFN) of the first PDCP SDU that the S-SN 106A forwards to the T-SN 106B. The S-SN 106A may not stop assigning PDCP SNs to DL PDCP SDUs or delivering UL packets in UL PDCP SDUs or UL PDCP SDUs to the UPF 162 until the S-SN 106A sends a second (e.g., last) SN Status Transfer message or content of the second SN Status Transfer message to the T-SN 106B via the MN 104. The S-SN 106A can send the second SN Status Transfer message to the MN 104 in response to or after the T-SN 106B receiving 619 the SN Reconfiguration Complete message. In turn, the MN 104 can forward the second SN Status Transfer message (or the content of the second SN Status Transfer message) to the S-SN 106A.

In some implementations, the MN 104 performs a Path Update procedure involving the CN 110 (e.g., MME114/S-GW 112 or AMF164/UPF 162) to update the data path between the S-SN 106A and the CN 110 to an updated data path between the T-SN 106B and the CN 110 in response to or after transmitting the SN Reconfiguration Complete message or receiving an SN Status Transfer message from the S-SN 106A. After updating the data path, the CN 110 sends DL data packets to the T-SN 106B instead of the S-SN 106A. In the Path Update procedure, the MN 104 (e.g., MeNB) in one implementation sends an E-RAB Modification Indication message to the MME 114, which in turn performs a Bearer Modification procedure with the S-GW 112 upon receiving the E-RAB Modification Indication message. As a result, the S-GW 112 updates the data path to the T-SN 106B. In another implementation, the MN 104 (e.g., Mng-eNB or MgNB) sends a PDU Session Resource Modify Indication message to the AMF 164, which in turn performs a Bearer Modification procedure with the UPF 162 upon receiving the PDU Session Resource Modify Indication message. As a result, the UPF 162 updates the data path to the T-SN 106B.

In some implementations, the MN 104 sends 628 the UE Context Release message to the S-SN 106A after forwarding the second SN Status Transfer message or its content to the S-SN 106A, or after completing the Path Update procedure.

In some implementations, after successfully completing the random access procedure, the UE 102 can start transmitting UL data PDUs to the T-SN 106B via the cell 126B, stop transmitting and retransmitting UL data PDUs to the S-SN 106A, stop transmitting control signals on PUCCH(s) to the S-SN 106A, stop transmitting new UL data PDUs to the S-SN 106A while continuing to retransmit UL data PDU(s) to the S-SN 106A, continue DL communication with the S-SN 106A, and/or keep transmitting control signals to the S-SN 106A until event 632 occurs or the DAPS release timer at the UE 102 expires, as described above with respect to FIG. 3. In some implementations, the S-SN 106A or T-SN 106B configures a time value for the DAPS release timer in the RRC reconfiguration message. Upon receiving 617, 632 the RRC reconfiguration message, the UE 102 starts the DAPS release timer. If the DAPS release timer expires, the UE 102 stops 636 communicating with the S-SN 106A. Alternatively, the UE 102 uses a predetermined timer value if the S-SN 106A or T-SN 106B does not include the timer value in the RRC reconfiguration message.

In some implementations, the T-SN 106B includes multiple configuration parameters in the RRC reconfiguration message to configure radio resources for the UE 102 to communicate with the T-SN 106B via the PSCell 126B. The multiple configuration parameters can configure physical layer, medium access control (MAC) layer, and radio link control bearers. The DAPS PSCell change configuration can be associated or specific to a radio bearer (e.g., DRB). For example, the T-SN 106B can include the DAPS PSCell change configuration in an RB configuration (e.g., RadioBearerConfig 1E, DRB-ToAddModList IE or DRB-ToAddMod IE) in the SN Addition Request Acknowledge message at event 613, and the MN 104 can include the RB configuration in the RRC container message at event 617. The S-SN 106A can also configure the particular DRB and transmit a RB configuration configuring the particular DRB to the UE 102.

In some implementations, the T-SN 106B can configure SCell(s) of the T-SN 106B in the multiple configuration parameters in the RRC reconfiguration message to configure radio resources for the UE 102 to communicate with the T-SN 106B via the SCell(s). In one such implementation, the T-SN 106B can include one or more SCell configurations configuring the SCell(s) and their states in the RRC reconfiguration message at event 614, and the UE 102 can determine the states of the SCell(s) according to the one or more SCell configurations. Particularly, the T-SN 106B can configure the SCell(s) to first be in deactivated state(s) while the UE 102 performs the DAPS procedure, and then transition to activated state(s) after releasing the DAPS at event 632. The T-SN 106B can transmit RRC message(s), MAC control element(s), or DCI command(s) to the UE 102 to configure the SCell(s) to be in activated state(s).

In some implementations, while performing the DAPS procedure, the UE 102 keeps an SCell of the S-SN 106A in activated state if the SCell is configured at event 602. The UE 102 can release the SCell of the S-SN 106A in response to the DAPS release at event 632. In other implementations, the T-SN 106B can include a release indication of the SCell of the S-SN 106A in the RRC reconfiguration message 614 that is transmitted to the UE 102, and the UE 102 does not release the SCell in response to the RRC reconfiguration message at event 614, and instead releases the SCell in response to the DAPS release at event 632. In yet other implementations, the T-SN 106B can include a release indication of the SCell of the S-SN 106A in the RRC reconfiguration message at event 632 that is transmitted to the UE 102, and the UE 102 does not release the SCell of the S-SN 106A in response to the handover command message, and instead releases the SCell in response to the release indication.

In some implementations, the T-SN 106B may not configure an SCell to the UE 102 in the RRC reconfiguration message. The T-SN 106B can later transmit RRC reconfiguration message(s) to the UE 102 to configure SCell(s) of the T-SN 106B. In response, the UE 102 can transmit an RRC reconfiguration complete message to the T-SN 106B via the PSCell 126B or a configured SCell for each of the RRC reconfiguration message(s).

In some implementations, the T-SN 106B identifies the UE 102 if the T-SN 106B receives a UE identifier (e.g., a C-RNTI) or a random access preamble from the UE 102 during the random access procedure. The UE identifier or random access preamble can be assigned by the T-SN 106B, in some implementations.

If the S-SN 106A is a gNB, the RRC reconfiguration message can be an RRCReconfiguration message and the RRC reconfiguration complete message can be an RRCReconfigurationComplete message as defined in 3GPP TS 38.331. If the S-SN 106A is an ng-eNB, the RRC reconfiguration message can be an RRCConnectionReconfiguration message and the RRC reconfiguration complete message can be an RRCConnectionReconfigurationComplete message as defined in 3GPP TS 36.331.

Inter-Frequency DAPS PSCell Change

Similar to the manner in which the DAPS handover capability discussed above in FIG. 3 can indicate that the UE 102 is capable of inter-frequency DAPS handover for one or more frequency bands, or for FDD and/or TDD modes, the DAPS PSCell change capability can indicate that the UE 102 is capable of inter-frequency DAPS PSCell change for one or more frequency bands, or for FDD or TDD modes. The MN 104, S-SN 106A, or T-SN 106B determines that the UE 102 is capable of the inter-frequency DAPS PSCell change for one or more frequency bands by referring to the DAPS PSCell change capability.

Similar to the manner in which the DAPS handover capability discussed above in FIG. 3 can indicate that the UE 102 is capable of DAPS handover which may or may not exclude the intra-frequency DAPS handover, the DAPS PSCell change capability can generally indicate that the UE 102 is capable of DAPS PSCell change which may or may not exclude the intra-frequency DAPS PSCell change. Similar to the manner in which the UE Capability IE discussed above in FIG. 3 can include one or more DC/CA band combination fields/IEs, the MN 104, S-SN 106A, T-SN 106B can determine that the UE 102 is capable of the inter-frequency DAPS PSCell change by referring to the DAPS PSCell change capability and the DC/CA band combination field/IE in a similar manner described above in FIG. 3.

In some implementations or scenarios, the cells 126A and 126B are similar to cells 124 and 126B discussed above in FIG. 3. Similar to the manner in which the S-BS 104 requests the T-BS 106B to configure DAPS handover or non-DAPS inter-frequency handover in the Handover Request message discussed above in FIG. 3, the MN 104 can request the DAPS PSCell change or non-DAPS PSCell change in the SN Addition Request message. Similar to the manner in which the T-BS 106B configures cell 126B in the handover command message discussed above in FIG. 3, the T-BS 106B configures the cell 126B in the RRC reconfiguration message.

Intra-Frequency DAPS PSCell Change

Similar to the manner in which the DAPS handover capability discussed above in FIG. 3 can indicate that the UE 102 is capable of intra-frequency DAPS handover for one or more frequency bands, and similar to the manner in which the DAPS PSCell change capability can indicate that the UE 102 is capable of intra-frequency DAPS handover for FDD and/or TDD modes, the DAPS PSCell change capability can indicate that the UE 102 is capable of intra-frequency DAPS PSCell change for one or more frequency bands, or for FDD and/or TDD modes.

Similar to the manner in which the UE Capability IE discussed above in FIG. 3 can include one or more DC/CA band combination fields/IEs, the MN 104, S-SN 106A, T-SN 106B can determine that the UE 102 is capable of the intra-frequency DAPS PSCell change by referring to the DAPS PSCell change capability and the DC/CA band combination field/IE in a similar manner described above in FIG. 3.

In some implementations or scenarios, the cells 126A and 126B are similar to cells 124 and 126B discussed above in FIG. 3. Similar to the manner in which the S-BS 104 requests the T-BS 106B to configure DAPS handover or non-DAPS intra-frequency handover in the Handover Request message discussed above in FIG. 3, the MN 104 can request the DAPS PSCell change or non-DAPS PSCell change in the SN Addition Request message. Similar to the manner in which the T-BS 106B configures cell 126B in the handover command message discussed above in FIG. 3, the T-SN 106B configures the cell 126B in the PSCell change command message.

Synchronous or Asynchronous DAPS PSCell Change

Similar to the manner in which the DAPS handover capability discussed above in FIG. 3 can indicate that the UE 102 is capable of synchronous DAPS handover and/or asynchronous DAPS handover (e.g., using "synchronous" and/or "asynchronous" indicators), the DAPS PSCell change capability indicates that the UE 102 is capable of synchronous DAPS PSCell change and/or asynchronous DAPS PSCell change.

Similar to the manner in which the S-BS 104 can send a Handover Request message to request the T-BS 106B to prepare the DAPS handover or non-DAPS handover in the handover command message discussed above in FIG. 3, the MN 104 can send an SN Addition Request message to request the T-SN 106B to prepare the DAPS PSCell change or non-DAPS PSCell change in an RRC reconfiguration message.

In FIG. 7, whereas in FIG. 6 the DAPS PSCell change scenario involves an SN change (i.e., a change from S-SN 106A to T-SN 106B), in FIG. 7 the DAPS PSCell change scenario 700 does not involve an SN change.

Initially, the UE 102 in DC communicates 702 data with the MN 104 via PCell 124 by using an MN configuration, and with the SN 106A via PSCell 123 by using an SN configuration.

Later in time, whereas in FIG. 6 the MN 104 determines 604 to initiate DAPS PSCell change involving an SN change (i.e., MN-initiated DAPS SN addition or change procedure) for the T-SN 106B and the UE 102 to communicate via a T-PSCell 126B, in FIG. 7 the SN 106A determines 704 to initiate DAPS PSCell change without involving an SN change (i.e., SN-initiated DAPS PSCell change procedure) for the SN 106A and the UE 102 to communicate via a T-PSCell 126A, e.g., blindly or in response to detecting a suitable event, similar to those described with respect to FIG. 3.

In response to the determination 704, the SN 106A generates 714 an RRC reconfiguration message that includes a DAPS PSCell change configuration (or a DAPS PSCell change indicator), similar to event 614, and transmits 717 the RRC reconfiguration message to the UE 102.

The DAPS PSCell change configuration enables the UE 102 to use a DAPS to communicate with the SN 106A via PSCell 123 and via T-PSCell 126A (during and after a successful DAPS PSCell change). As such, in response to receiving 717 the RRC reconfiguration message, the UE 102 and the SN 106A continue 720 communicating with each other (i.e., in DC with the MN 104) while the UE 102 attempts to perform DAPS PSCell change to the T-PSCell 126A in accordance with the RRC reconfiguration message. In attempting to perform the DAPS PSCell change, the UE 102 initiates 722 a random access procedure with the T-PSCell 126A, e.g., by using one or more random access configurations in the RRC reconfiguration message. After the SN 106A identifies the UE 102 during the random access procedure via the T-PSCell 126A, the UE 102 communicates 726 in DC with MN 104 and the SN 106A via the T-PSCell 126A by using configurations in the RRC configuration message, while continuing to communicate via the PSCell 123. The UE 102 can also send 724 an RRC reconfiguration complete message to the SN 106A after performing the random access procedure.

After receiving 724 the RRC reconfiguration complete message or if the SN 106A does not receive DL data packets from the CN 110 via PSCell 123, the SN 106A stops 730 communicating with the UE 102 via the PSCell 123.

As the UE 102 no longer needs to use the DAPS to continue communicating with the SN 106A via the PSCell 123, the SN 106A can transmit 732 an RRC reconfiguration message that includes a DAPS release indicator to the UE 102, e.g., via an SRB (e.g., SRB3) between the UE 102 and the SN 106A or via the MN 104. In response to the RRC reconfiguration message, the UE 102 can transmit 734 an RRC reconfiguration complete message to the SN 106A via the SRB (e.g., SRB3) between the UE 102 and the SN 106A or via the MN 104, and stop 736 communicating with the S-SN 106A via the PCell 123. The events 722, 724, 726, 730, 732, 734 are collectively referred to in FIG. 7 as the DAPS PSCell change and DAPS release procedure 750.

In FIG. 8, in a DAPS PSCell change scenario 800, the base station 106, which serves as an SN, includes a CU 172 for the UE 102, and two DUs 174 that operate as a source DU (S-DU) for the UE 102 and a target DU (T-DU) for the UE 102, respectively. Alternatively, the base station 106, includes a CU 172 for the UE 102, and three DUs 174 that operate as a master DU (M-DU) for the UE 102, a source DU (S-DU) for the UE 102, and a target DU (T-DU) for the UE 102, respectively.

Initially, the UE 102 in DC communicates 802 data with the MN 104 via cell 122 and the base station 106A (which includes the CU 172 and S-DU 174A) via PSCell 123 by using an SN configuration. Alternatively, the UE 102 in DC communicates 802 data with the M-DU 174 of the base station 106A and the CU 172 and S-DU 174A of the base station 106A via PSCell 123 by using a BS configuration Later in time, the CU 172 determines 804 to initiate DAPS PSCell change for the T-DU 174B and the UE 102 to communicate via PSCell 126A, e.g., blindly or in response to detecting a suitable event, similar to those described with respect to FIG. 3. For example, the CU 172 initiates DAPS PSCell change in response to measurement result(s) obtained by the CU 172 from measurements on signals received from the UE 102 via S-DU 174A.

In response to the determination 804, the CU 172 sends 806 a UE Context Setup Request message to the T-DU 174B. In response, the T-DU 174B sends 808 a UE Context Setup Response message including a T-DU configuration to the CU 172. In turn, the CU 172 generates 814 an RRC reconfiguration message which includes the T-DU configuration and a DAPS PSCell change configuration or an indication for the DAPS PSCell change configuration in a field or an IE. Then the CU 172 sends 816 the RRC reconfiguration message to the S-DU 174A, which in turn transmits 818 the RRC reconfiguration message to the UE 102.

The DAPS PSCell change configuration enables the UE 102 to use a DAPS to communicate with the S-DU 174A via PSCell 123 as well as T-DU 174B via T-PSCell 126A using the T-DU configuration during and after a successful DAPS PSCell change. As such, in response to the RRC reconfiguration message, the UE 102 and the base station 106 continue 820 communicating with each other via the S-DU 174A by using the BS configuration, while the UE 102 attempts to perform DAPS PSCell change to the T-DU 174B via T-PSCell 126A in accordance with the RRC reconfiguration message. In attempting to perform the DAPS PSCell change, the UE 102 initiates 822 a random access procedure with the T-DU 174B, e.g., by using one or more random access configurations in the T-DU configuration. After gaining access to a control channel, the UE 102 transmits 823 an RRC reconfiguration complete message to the T-DU 174B during or after successfully completing the random access procedure, which in turn sends 824 the RRC reconfiguration complete message to the CU 172. After the T-DU 174B identifies the UE 102 during the random access configuration, the UE 102 communicates 826 control signals and data with the CU 172 via the T-DU 174B by using the T-DU configuration included in the RRC reconfiguration message. If the RRC reconfiguration message includes configurations (e.g., DAPS PSCell change configuration) generated by the CU 172, the UE 102 communicates 826 with the CU 172 via the T-DU 174B by using the configurations generated by the CU 172.

After receiving 824 the RRC reconfiguration complete message, the CU 172 stops 830 communicating with the UE 102 via the S-DU 174A. The CU 172 can then send 831 an RRC reconfiguration message that includes a DAPS release indicator to the T-DU 174B, which in turn can send 832 the RRC reconfiguration message to the UE 102. In some implementations, the CU 172 stops 830 communicating with the UE 102 after transmitting the RRC reconfiguration message to the T-DU 174B. In response to the RRC reconfiguration message, the UE 102 can transmit 833 an RRC reconfiguration complete message to the T-DU 174B and stop 836 communicating with the S-DU 174A. In turn, the T-DU 174B can send 834 the RRC reconfiguration complete message to the CU 172.

As the UE 102 no longer needs to use the DAPS to continue communicating with the S-DU 174A, the CU 172 can perform 840 a UE Context Release procedure with the S-DU 174A in response to the RRC reconfiguration complete message. Particularly, the CU 172 sends a UE Context Release Command message to the S-DU 174A, which in turn sends a UE Context Release Complete message to the CU 172 and stops communicating with the UE 102. By performing the UE Context Release procedure in response to the RRC reconfiguration complete message, the CU 172 maintains the UE context longer relative to a non-DAPS PSCell change procedure when performing a DAPS PSCell change procedure. The events 822, 823, 824, 826, 830, 831, 832, 833, 834, 840 are collectively referred to in FIG. 8 as the DAPS PSCell change and DAPS release procedure 850.

In some implementations, the CU 172 in event 816 can send a UE Context Modification Request message including the RRC reconfiguration message to the S-DU 174A. The S-DU 174A in turn can send a UE Context Modification Response message to the CU 172. In some implementations, the CU 172 can indicate not to stop data transmission to the UE 102 in the Context Modification Request message in response to the determination 804, so that the S-DU 174A continues communicating with the UE 102. For example, the CU 172 may not include a "Transmission Action Indicator" IE in the Context Modification Request message, or include a "Transmission Action Indicator" IE set to "restart" in the Context Modification Request message to indicate not to stop data transmission to the UE 102. In other implementations, the CU 172 can include an IE indicating DAPS PSCell change in the Context Modification Request message so that the S-DU 174A continues communicating with the UE 102. In yet other implementations, the CU 172 in event 816 can send a DL RRC Message Transfer message (instead of the UE Context Modification Request message) including the RRC reconfiguration message to the S-DU 174A.

Figure 9:
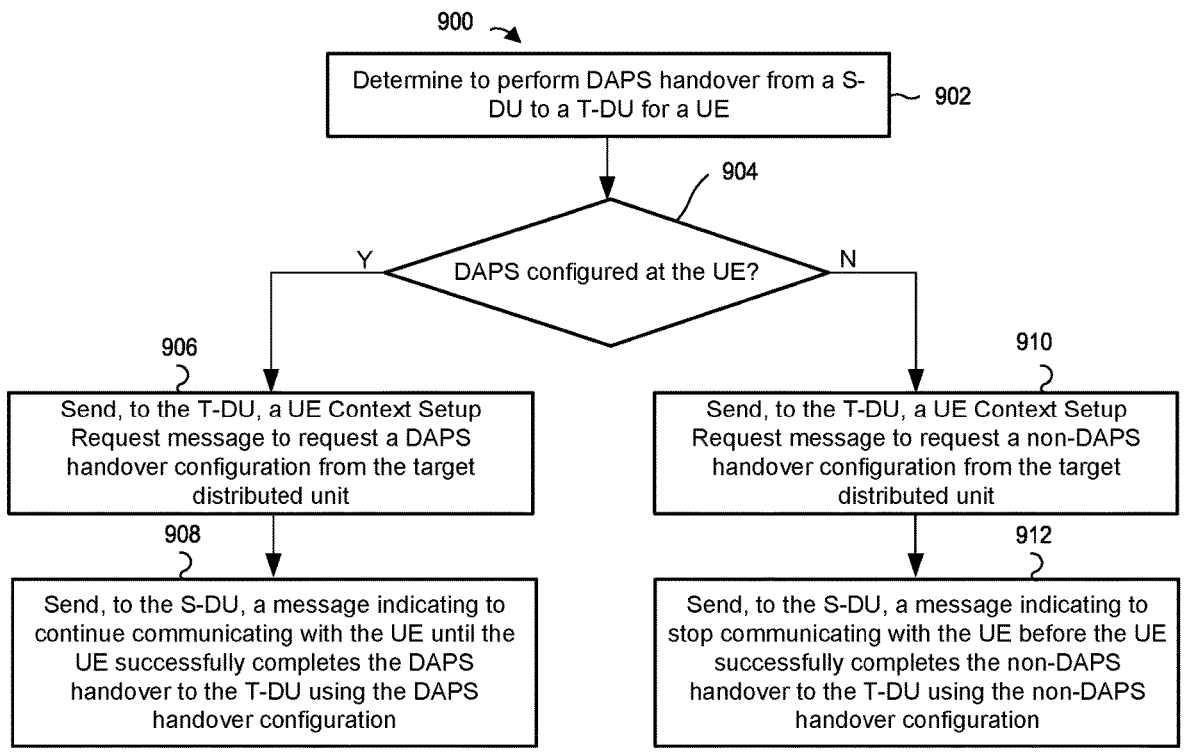
FIG. 9 is a flow diagram depicting an example method for preparing a UE to perform DAPS handover, from a source DU of a base station to a target DU of the base station.

FIG. 9 is a flow diagram depicting an example method 900, implemented in a centralized unit of a base station (e.g., base station 104), for preparing a user device (e.g., UE 102) to perform DAPS handover, from a source distributed unit of the base station to a target distributed unit of the base station.

At block 902, the centralized unit determines to perform DAPS handover from the source distributed unit to the target distributed unit for the user device (e.g., in event 504).

At block 904, the centralized unit determines whether the user device is configured with a DAPS (e.g., in event 504). The centralized unit can determine whether the user device is configured with a DAPS according to a DAPS handover capability in a UE Capability IE of a message (e.g., in a UECapabilityInformation message) received from the user device, a core network, or another base station.

If the centralized unit determines that the user device is configured with the DAPS, at block 906, the centralized unit sends, to the target distributed unit, a UE Context Setup Request message to request a DAPS handover configuration from the target distributed unit (e.g., in event 506). Then, at block 908, the centralized unit sends, to the source distributed unit, a message indicating to continue communicating with the user device until the user device successfully completes the DAPS handover to the target distributed unit using the DAPS handover configuration (e.g., in event 516). The message can be a handover command message, a DL RRC Message Transfer message, or a UE Context Modification Request message.

If the centralized unit determines that the user device is not configured with the DAPS, at block 910, the centralized unit sends, to the target distributed unit, a UE Context Setup Request message to request a non-DAPS handover configuration from the target distributed unit, and subsequently at block 912, sends to the source distributed unit, a message indicating to stop communicating with the user device before the user device successfully completes the non-DAPS handover to the target distributed unit using the non-DAPS handover configuration. The message can be a handover command message, a DL RRC Message Transfer message, or a UE Context Modification Request message.

Figure 10:
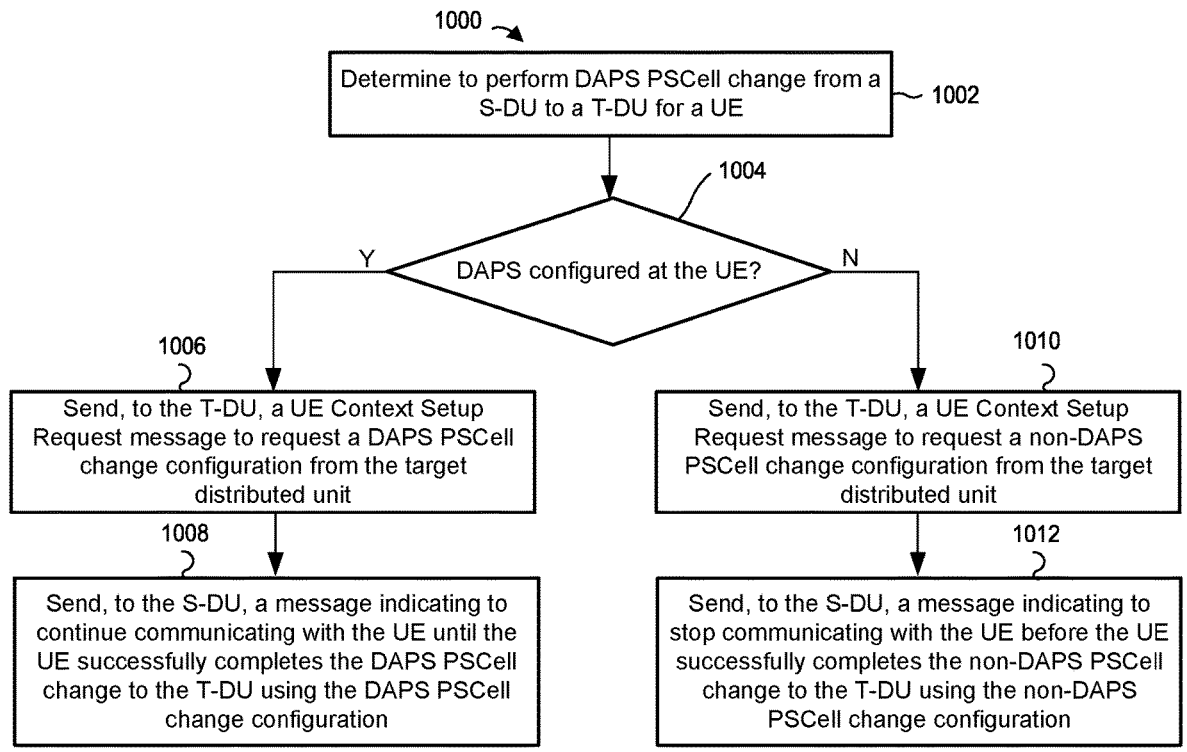
FIG. 10 is a flow diagram depicting an example method for preparing a UE to perform DAPS PSCell change, from a source DU of a base station to a target DU of the base station.

FIG. 10 is a flow diagram depicting an example method 1000, implemented in a centralized unit of a base station (e.g., base station 104), for preparing a user device (e.g., UE 102) to perform DAPS PSCell change, from a source distributed unit of the base station to a target distributed unit of the base station.

At block 1002, the centralized unit determines to perform DAPS PSCell change from the source distributed unit to the target distributed unit for the user device (e.g., in event 804).

At block 1004, the centralized unit determines whether the user device is configured with a DAPS (e.g., in event 804). The centralized unit can determine whether the user device is configured with a DAPS according to a DAPS PSCell change capability in a UE Capability IE of a message (e.g., in a UECapabilityInformation message) received from the user device, a core network, or another base station.

If the centralized unit determines that the user device is configured with the DAPS, at block 1006, the centralized unit sends, to the target distributed unit, a UE Context Setup Request message to request a DAPS PSCell change configuration from the target distributed unit (e.g., in event 806). Then, at block 1008, the centralized unit sends, to the source distributed unit, a message indicating to continue communicating with the user device until the user device successfully completes the DAPS PSCell change to the target distributed unit using the DAPS configuration (e.g., in event 516). The message can be an RRC reconfiguration message, a DL RRC Message Transfer message, or a UE Context Modification Request message.

If the centralized unit determines that the user device is not configured with the DAPS, at block 1010, the centralized unit sends, to the target distributed unit, a UE Context Setup Request message to request a non-DAPS PSCell change configuration from the target distributed unit, and subsequently at block 1012, sends to the source distributed unit, a message indicating to stop communicating with the user device before the user device successfully completes the non-DAPS PSCell change to the target distributed unit using the non-DAPS PSCell change configuration. The message can be an RRC reconfiguration message, a DL RRC Message Transfer message, or a UE Context Modification Request message.

Figure 11:
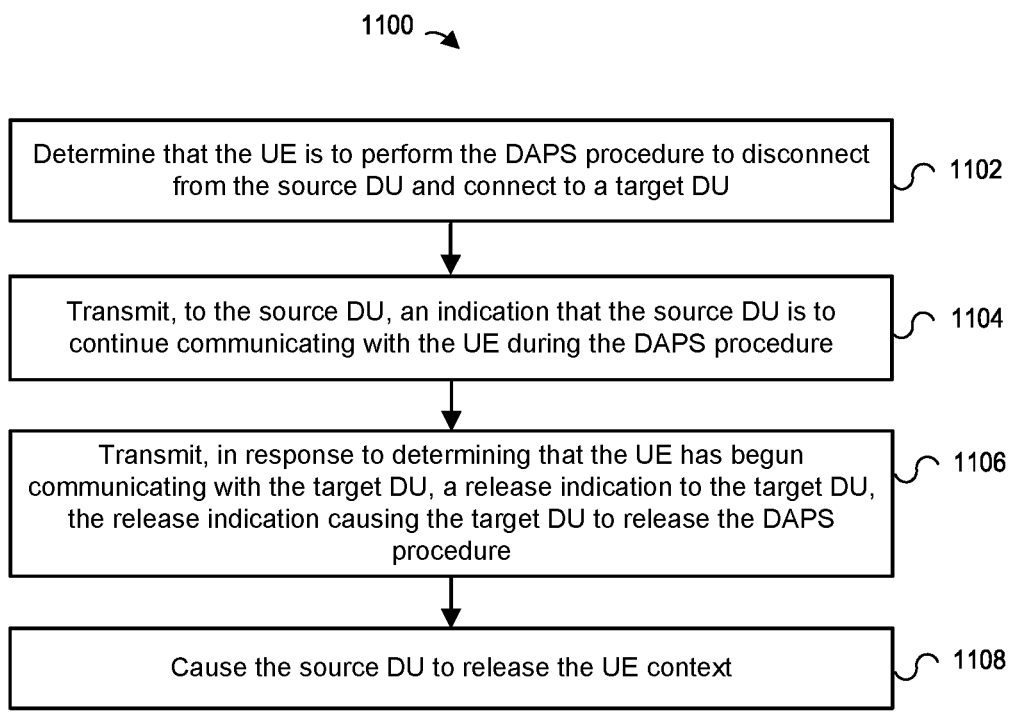
FIG. 11 is a flow diagram depicting an example method in a central unit (CU) of a distributed base station for configuring a DAPS procedure at a UE communicating with the distributed base station via a source distributed unit (DU).

FIG. 11 is a flow diagram depicting an example method 1100 in a CU of a distributed base station for configuring a DAPS procedure at a UE communicating with the distributed base station via a source DU.

At block 1102, the CU determines that the UE is to perform the DAPS procedure to disconnect from the source DU and connect to a target DU (e.g., in any one of events 504, 804).

At block 1104, the CU transmits, to the source DU, an indication that the source DU is to continue communicating with the UE during the DAPS procedure (e.g., in any one of events 516, 816).

At block 1106, the CU transmits, in response to determining that the UE has begun communicating with the target DU, a release indication to the target DU, the release indication causing the target DU to release the DAPS procedure (e.g., in any one of events 531, 831).

At block 1108, the CU, subsequently to transmitting the release indication, causes the source DU to release the UE context (e.g., in any one of events 540, 840).

The following description may be applied to the description above.

A user device in which the techniques of this disclosure can be implemented (e.g., the UE 102) can be any suitable device capable of wireless communications such as a smartphone, a tablet computer, a laptop computer, a mobile gaming console, a point-of-sale (POS) terminal, a health monitoring device, a drone, a camera, a media-streaming dongle or another personal media device, a wearable device such as a smartwatch, a wireless hotspot, a femtocell, or a broadband router. Further, the user device in some cases may be embedded in an electronic system such as the head unit of a vehicle or an advanced driver assistance system (ADAS). Still further, the user device can operate as an internet-of-things (IoT) device or a mobile-internet device (MID). Depending on the type, the user device can include one or more general-purpose processors, a computer-readable memory, a user interface, one or more network interfaces, one or more sensors, etc.

Certain embodiments are described in this disclosure as including logic or a number of components or modules. Modules may can be software modules (e.g., code, or machine-readable instructions stored on non-transitory machine-readable medium) or hardware modules. A hardware module is a tangible unit capable of performing certain operations and may be configured or arranged in a certain manner. A hardware module can comprise dedicated circuitry or logic that is permanently configured (e.g., as a special-purpose processor, such as a field programmable gate array (FPGA) or an application-specific integrated circuit (ASIC), a digital signal processor (DSP), etc.) to perform certain operations. A hardware module may also comprise programmable logic or circuitry (e.g., as encompassed within a general-purpose processor or other programmable processor) that is temporarily configured by software to perform certain operations. The decision to implement a hardware module in dedicated and permanently configured circuitry, or in temporarily configured circuitry (e.g., configured by software) may be driven by cost and time considerations.

When implemented in software, the techniques can be provided as part of the operating system, a library used by multiple applications, a particular software application, etc. The software can be executed by one or more general-purpose processors or one or more special-purpose processors.

Upon reading this disclosure, those of skill in the art will appreciate still additional and alternative structural and functional designs for handling mobility between base stations through the principles disclosed herein. Thus, while particular embodiments and applications have been illustrated and described, it is to be understood that the disclosed embodiments are not limited to the precise construction and components disclosed herein. Various modifications, changes and variations, which will be apparent to those of ordinary skill in the art, may be made in the arrangement, operation and details of the method and apparatus disclosed herein without departing from the spirit and scope defined in the appended claims.

Example 1. A method in a central unit (CU) of a distributed base station for configuring a dual active protocol stack (DAPS) procedure at a UE communicating with the distributed base station via a source distributed unit (DU), the method comprising: transmitting, by the processing hardware and to the UE, a command to perform the DAPS procedure in order to disconnect from the source DU and connect to a target DU; transmitting, by the processing hardware and to the source DU, an indication that the source DU is to continue communicating with the UE during the DAPS procedure; in response to determining that the UE has begun communicating with the target DU, transmitting a release indication to the target DU, the release indication causing the target DU to release the DAPS procedure; and subsequently to transmitting the release indication, causing the source DU to release the UE context.

Example 2. The method of example 1, wherein the indication transmitted to the source DU is a Transmission Action Indicator information element (IE).

Example 3. The method of example 2, including assigning a "restart" value to the Transmission Action Indicator IE.

Example 4. The method of example 1, wherein the indication transmitted to the source DU is included in a handover command.

Example 5. The method of example 4, wherein the handover command is included in a UE Context Modification Request.

Example 6. The method of example 1, wherein causing the source DU to release the UE context includes transmitting a UE Context Release Command to the source DU.

Example 7. The method of example 6, further comprising: receiving, from the source DU and in response to the UE Context Release Command, a UE Context Release Complete message.

Example 8. The method of example 1, wherein the causing occurs concurrently with the target DU transmitting, to the UE, an indication that the DAPS procedure is released.

Example 9. The method of example 1, wherein the DAPS procedure is a handover procedure.

Example 10. The method of example 1, wherein the DAPS procedure is a DAPS primary secondary cell (PSCell) change procedure.

What is claimed is:

1. A method in a central unit (CU) of a distributed base station for configuring a dual active protocol stack (DAPS) procedure at a UE communicating with the distributed base station via a source distributed unit (DU), the method comprising:
    determining, by the CU, that the UE is to perform the DAPS procedure in order to disconnect from the source DU and connect to a target DU;
    transmitting, by the CU and to the source DU, a first message indicating that the source DU is to continue communicating with the UE during the DAPS procedure; and
    subsequent to obtaining an indication of the UE connecting to the target DU during the DAPS procedure, transmitting, by the CU and to the source DU, a second message indicating that the source DU is to stop communicating with the UE.

2. The method of claim 1, wherein the first message is a DL RRC Message Transfer message.

3. The method of claim 1, wherein the first message is included in a handover command.

4. The method of claim 3, wherein the handover command is included in a UE Context Modification Request.

5. The method of claim 4, wherein the UE Context Modification Request excludes a Transmission Action Indicator field, the exclusion indicating that the source DU is to continue communicating with the UE during the DAPS procedure.

6. The method of claim 4, wherein the UE Context Modification Request includes a Transmission Action Indicator indicative of a restart of communications with the UE, thereby indicating that the source DU is to continue communicating with the UE during the DAPS procedure.

7. The method of claim 1,
    further comprising transmitting, by the CU and to the target DU, a message to request a DAPS configuration for the UE to perform the DAPS procedure; and
    wherein the UE continues communicating with the source DU using the DAPS configuration.

8. The method of claim 7, wherein the message transmitted to the target DU is a UE Context Setup Request message.

9. The method of claim 1, further comprising:
    causing the source DU to release a context of the UE subsequent to the obtaining of the indication of the UE connecting to the target DU during the DAPS procedure.

10. The method of claim 9, wherein causing the source DU to release the UE context includes transmitting a UE Context Release Command to the source DU.

11. The method of claim 10, further comprising:
    receiving, from the source DU and in response to the UE Context Release Command, a UE Context Release Complete message.

12. The method of claim 1, wherein the DAPS procedure is a DAPS handover procedure.

13. The method of claim 1, wherein the DAPS procedure is a DAPS primary secondary cell (PSCell) change procedure.

14. A central unit (CU) of a distributed base station for configuring a dual active protocol stack (DAPS) procedure at a UE communicating with the distributed base station via a source distributed unit (DU), the CU comprising processing hardware and configured to:
    determine that the UE is to perform the DAPS procedure in order to disconnect from the source DU and connect to a target DU;
    transmit, to the source DU, a first message indicating that the source DU is to continue communicating with the UE during the DAPS procedure; and
    subsequent to obtaining an indication of the UE connecting to the target DU during the DAPS procedure, transmit, by the CU and to the source DU, a second message indicating that the source DU is to stop communicating with the UE.

15. The CU of claim 14, wherein the first message is a DL RRC Message Transfer message or the first message is included in a UE Context Modification Request of a handover command.

16. The CU of claim 15, wherein the UE Context Modification Request excludes a Transmission Action Indicator field, the exclusion indicating that the source DU is to continue communicating with the UE during the DAPS procedure.

17. The CU of claim 15, wherein the UE Context Modification Request includes a Transmission Action Indicator indicative of a restart of communications with the UE, thereby indicating that the source DU is to continue communicating with the UE during the DAPS procedure.

18. The CU of claim 14, wherein the DAPS procedure is a DAPS handover procedure or a DAPS primary secondary cell (PSCell) change procedure.

19. The CU of claim 14, wherein:
    the CU is further configured to transmit, to the target DU, a message to request a DAPS configuration for the UE to perform the DAPS procedure; and
    the UE continues communicating with the source DU using the DAPS configuration.

20. The CU of claim 14, wherein the CU is further configured to:
    cause the source DU to release a context of the UE subsequent to the obtaining of the indication of the UE connecting to the target DU during the DAPS procedure.

* * * * *